(12) United States Patent
Hasegawa et al.

(10) Patent No.: US 11,811,271 B2
(45) Date of Patent: Nov. 7, 2023

(54) COMPRESSOR

(71) Applicant: FUJITSU GENERAL LIMITED, Kanagawa (JP)

(72) Inventors: Tomooki Hasegawa, Kanagawa (JP); Takashi Suzuki, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 496 days.

(21) Appl. No.: 16/979,410

(22) PCT Filed: Mar. 14, 2019

(86) PCT No.: PCT/JP2019/010694
§ 371 (c)(1),
(2) Date: Sep. 9, 2020

(87) PCT Pub. No.: WO2019/177124
PCT Pub. Date: Sep. 19, 2019

(65) Prior Publication Data
US 2021/0057949 A1 Feb. 25, 2021

(30) Foreign Application Priority Data
Mar. 15, 2018 (JP) ................................ 2018-048097

(51) Int. Cl.
*H02K 1/32* (2006.01)
*H02K 1/27* (2022.01)
(Continued)

(52) U.S. Cl.
CPC ............... *H02K 1/32* (2013.01); *H02K 1/276* (2013.01); *H02K 1/30* (2013.01); *H02K 7/14* (2013.01)

(58) Field of Classification Search
CPC ............ H02K 1/276; H02K 1/28; H02K 1/30; H02K 1/2766; H02K 1/32; H02K 7/14
(Continued)

(56) References Cited

U.S. PATENT DOCUMENTS 5,666,015 A * 9/1997 Uchibori .................. H02K 7/04
310/156.53
6,533,558 B1 * 3/2003 Matsumoto .............. H02K 7/14
417/410.3
(Continued)

FOREIGN PATENT DOCUMENTS

CN 101584099 A 11/2009
CN 204794428 U 11/2015
(Continued)

OTHER PUBLICATIONS

Chinese Office Action (CNOA) dated Sep. 23, 2022 for Chinese Patent Application No. 201980018447.2; Partial English translation.
(Continued)

*Primary Examiner* — Alex W Mok
(74) *Attorney, Agent, or Firm* — Rankin, Hill & Clark LLP

(57) ABSTRACT

A compressor includes a rotor, a stator configured to rotate the rotor, a compressor unit configured to compress a refrigerant with rotation of the rotor, and a housing in which an internal space for housing the rotor, the stator, and the compressor unit is formed, wherein the rotor includes a rotor core that has an upper surface and a lower surface, an edge plate that covers the upper surface or the lower surface, and a fixing member that fixes the edge plate to the rotor core, a plurality of refrigerant holes through which the refrigerant passes are formed in the rotor core, an opening that allows the plurality of refrigerant holes to communicate with the internal space and a fixing member opening through which
(Continued)

the fixing member penetrates are formed in the edge plate, and a thickness portion is formed between the opening and the fixing member opening.

5 Claims, 12 Drawing Sheets

(51) Int. Cl.
*H02K 1/30* (2006.01)
*H02K 7/14* (2006.01)
*H02K 1/276* (2022.01)

(58) Field of Classification Search
USPC .......................................................... 310/54
See application file for complete search history.

(56) References Cited

U.S. PATENT DOCUMENTS

| | | | | |
|---|---|---|---|---|
| 8,337,185 | B2* | 12/2012 | Tanaka | F04C 18/3564 |
| | | | | 418/94 |
| 8,659,195 | B2* | 2/2014 | Tanaka | F04C 23/008 |
| | | | | 310/66 |
| 9,243,638 | B2* | 1/2016 | Mera | H02K 1/20 |
| 9,388,808 | B2* | 7/2016 | Iitsuka | F04C 23/008 |
| 2006/0017342 | A1* | 1/2006 | Park | H02K 1/278 |
| | | | | 310/156.19 |
| 2009/0293534 | A1* | 12/2009 | Tanaka | F04C 29/026 |
| | | | | 62/470 |
| 2010/0061868 | A1* | 3/2010 | Kojima | F04C 23/008 |
| | | | | 310/60 A |
| 2012/0007455 | A1* | 1/2012 | Tanaka | H02K 1/276 |
| | | | | 310/66 |
| 2012/0269667 | A1* | 10/2012 | Sakima | F04C 29/0021 |
| | | | | 417/423.7 |
| 2014/0044574 | A1* | 2/2014 | Iitsuka | F04C 18/0215 |
| | | | | 417/410.5 |

FOREIGN PATENT DOCUMENTS

| | | |
|---|---|---|
| CN | 106953441 A | 7/2017 |
| JP | 2008-206342 A | 9/2008 |
| JP | 2012-253884 A | 12/2012 |
| JP | 2013-99051 A | 5/2013 |
| JP | 2016-96670 A | 5/2016 |
| JP | 2017-8949 A | 1/2017 |

OTHER PUBLICATIONS

International Search Report (ISR) dated Jun. 11, 2019 filed in PCT/JP2019/010694.

* cited by examiner

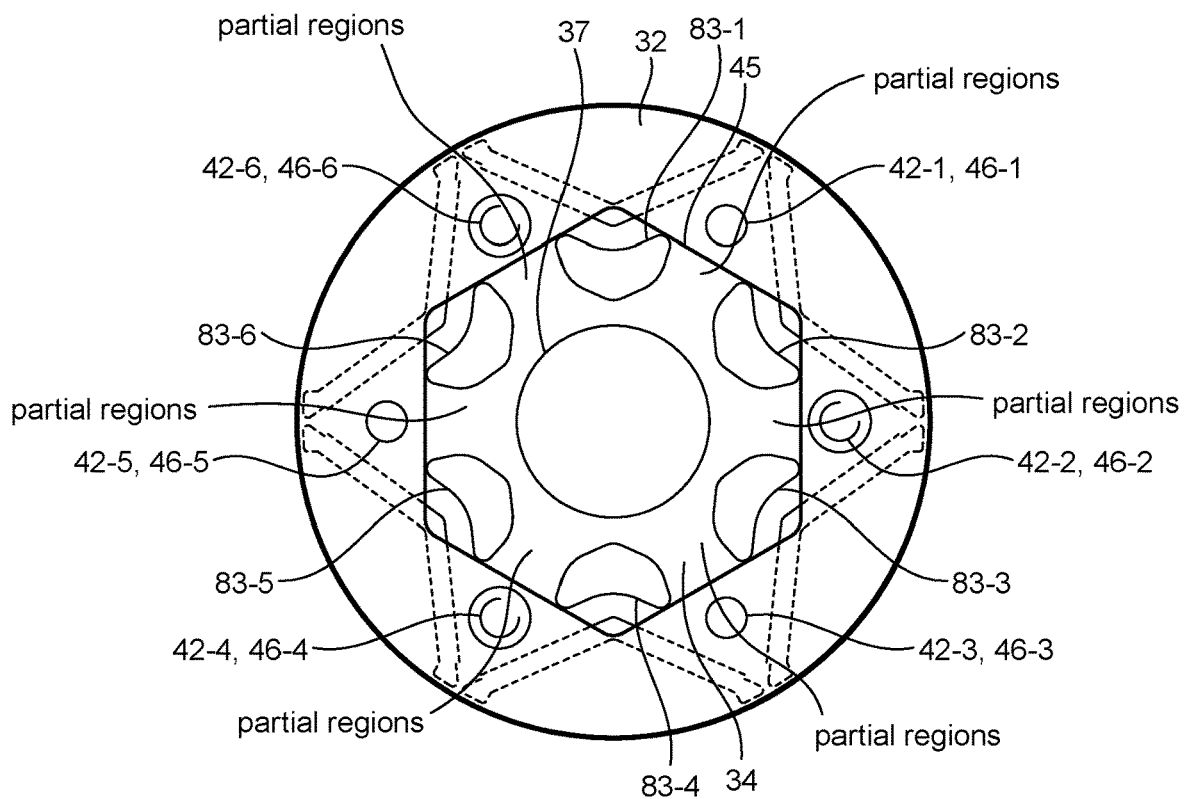
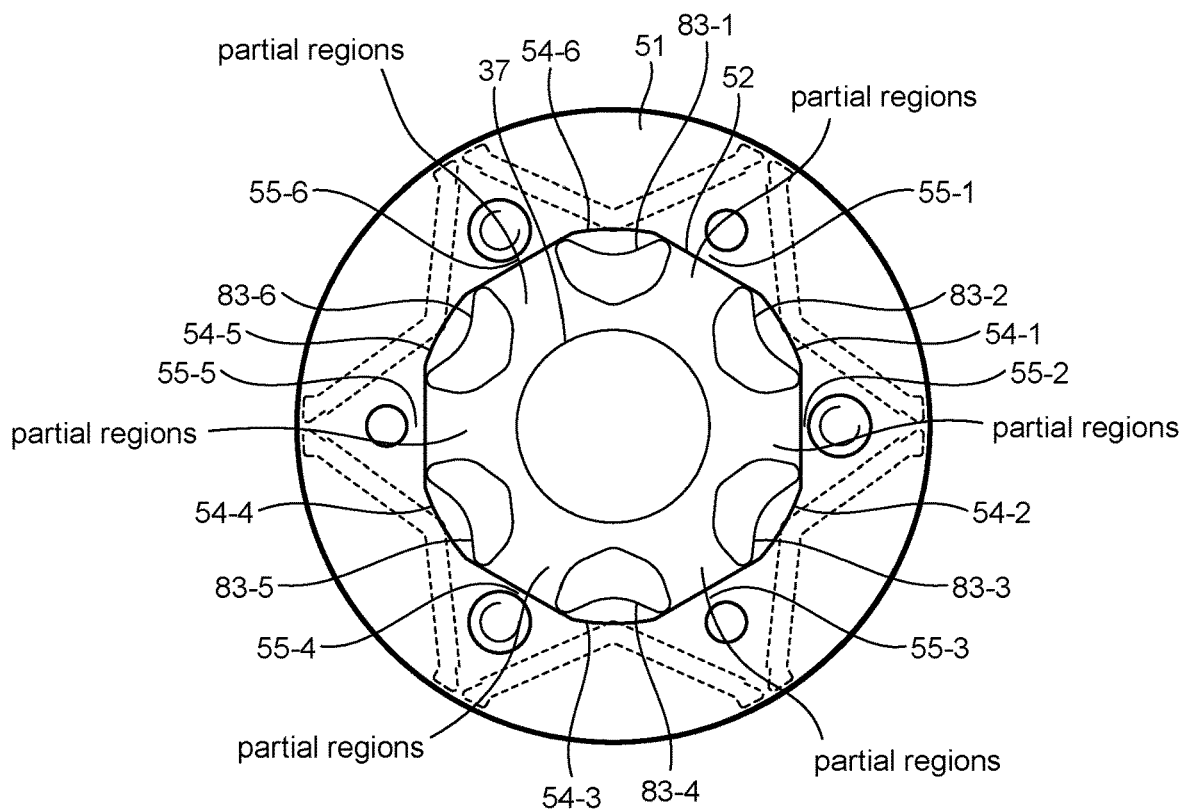

COMPRESSOR

FIELD

The technology of the present disclosure relates to a compressor.

BACKGROUND

A hermetically sealed compressor in which a compressor unit and a motor unit are housed in a sealed housing is known. The motor unit includes a stator and a rotor. The stator generates a rotary magnetic field, thereby causing the rotor to rotate. The compressor unit compresses a refrigerant with rotation of the rotor. The rotor further includes a rotor core in which a permanent magnet is embedded, and rotor edge plates that are fixed at both ends of the rotor core to prevent the permanent magnet from coming off, for example. A shaft holder hole for holding a shaft that functions as a rotation axis of the rotor is formed in the rotor core (see Patent Literatures 1 and 2).

CITATION LIST

Patent Literature

Patent Literature 1: Japanese Laid-open Patent Publication No. 2012-253884
Patent Literature 2: Japanese Laid-open Patent Publication No. 2015-096670

SUMMARY

Technical Problem

A plurality of refrigerant holes through which the refrigerant compressed by the compressor unit flows are formed in the rotor, and refrigerant openings through which the refrigerant that has flown through the plurality of refrigerant holes passes are formed in the rotor edge plates. Further, rivet openings through which rivets, which serve as fixing members for fixing the rotor edge plates to the rotor core, penetrate are formed in the rotor edge plates. However, there is a problem in that strength of the rotor edge plates as described above is reduced due to formation of the rivet openings together with the refrigerant openings.

The disclosed technology has been conceived in view of the circumstances as described above, and an object of the disclosed technology is to provide a compressor in which an opening through which a refrigerant passes is formed in a rotor edge plate and ensure strength of the rotor edge plate.

Solution to Problem

According to an aspect of the disclosure, a compressor includes a rotor, a stator configured to rotate the rotor, a compressor unit configured to compress a refrigerant with rotation of the rotor, and a housing in which an internal space for housing the rotor, the stator, and the compressor unit is formed, wherein the rotor includes a rotor core that is formed in a cylindrical shape and has an upper surface and a lower surface, an edge plate that covers at least one of the upper surface and the lower surface, and a fixing member that fixes the edge plate to the rotor core, a plurality of refrigerant holes through which the refrigerant passes are formed in the rotor core, an opening that allows the plurality of refrigerant holes to communicate with the internal space is formed in the edge plate, a fixing member opening through which the fixing member penetrates is formed in the edge plate, and a thickness portion for increasing strength of the edge plate is formed between the opening and the fixing member opening.

Advantageous Effects of Invention

The disclosed compressor makes it possible to form an opening through which a refrigerant passes in a rotor edge plate and ensure strength of the rotor edge plate.

BRIEF DESCRIPTION OF DRAWINGS

FIG. 15 is a plan view of a rotor in which a lower rotor edge plate of the compressor of the fifth embodiment is mounted on the rotor core.
FIG. 16 is a plan view of a rotor in which a lower rotor edge plate of a compressor of a sixth embodiment is mounted on a rotor core.

DESCRIPTION OF EMBODIMENTS

Embodiments of a compressor disclosed in the present application will be described below with reference to the drawings. The disclosed technology is not limited by the descriptions below. Further, in the descriptions below, the same structural elements are denoted by the same reference symbols, and repeated explanation will be omitted.

First Embodiment

Figure 1:
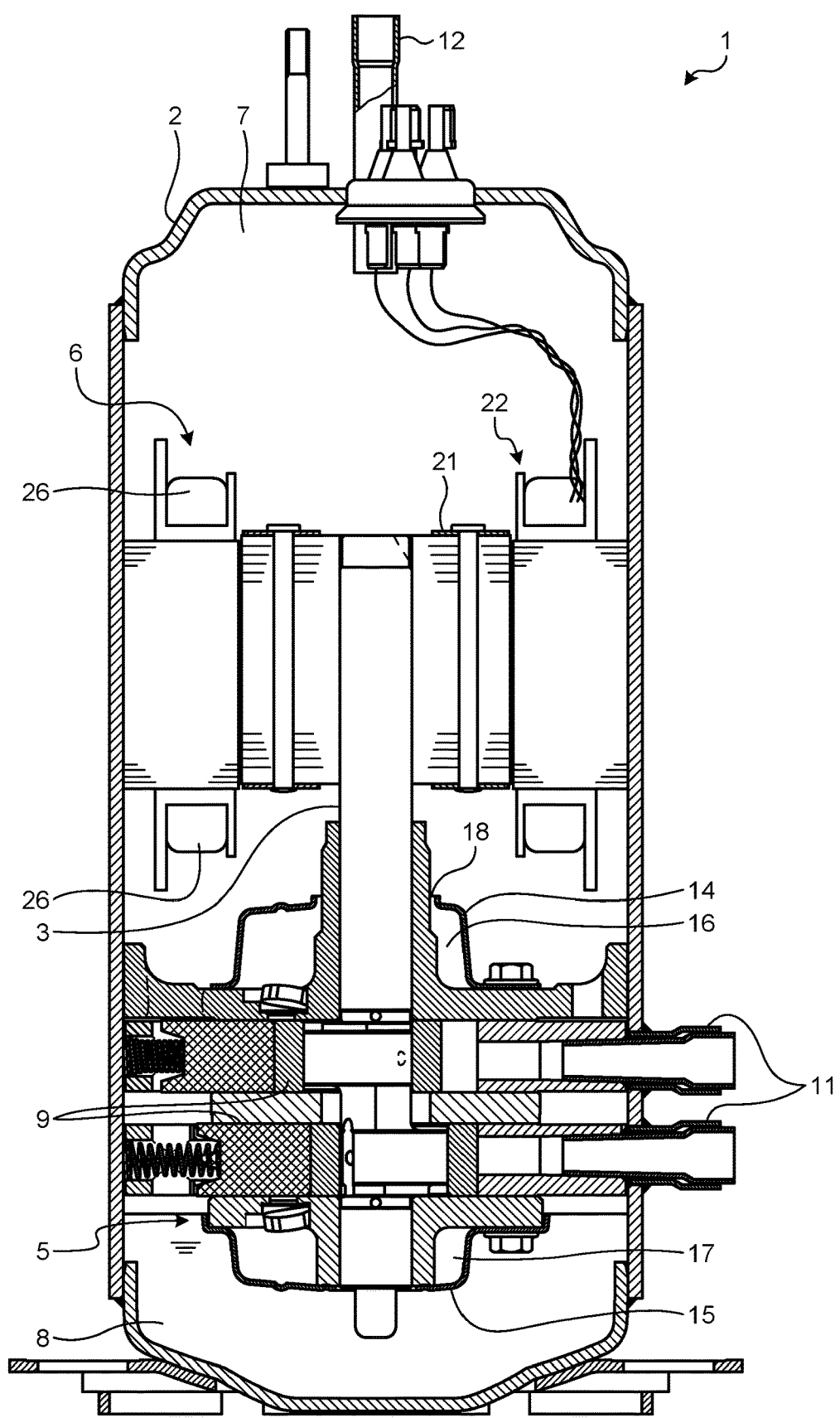
FIG. 1 is a vertical cross-sectional view of a compressor of a first embodiment.

FIG. 1 is a vertical cross-sectional view of a compressor 1 according to a first embodiment. As illustrated in FIG. 1, the compressor 1 includes a housing 2, a shaft 3, a compressor unit 5, and a motor unit 6. The housing 2 forms a sealed internal space 7. The internal space 7 is formed in an approximately cylindrical shape. The housing 2 is formed such that the central axis of the cylinder of the internal space 7 is parallel to a vertical direction when the housing 2 is placed perpendicular to a horizontal plane. In the housing 2, an oil reservoir 8 is formed in a lower part of the internal space 7. In the oil reservoir 8, refrigeration machine oil for lubrication of the compressor unit 5 is stored. Suction pipes 11 for sucking a refrigerant and a discharge pipe 12 for discharging a compressed refrigerant are connected to the housing 2. The shaft 3 is formed in a rod-like shape and is arranged in the internal space 7 of the housing 2 such that one end of the shaft 3 is disposed in the oil reservoir 8. The shaft 3 is supported on the housing 2 such that the shaft 3 is rotatable about a rotation axis that is parallel to the central axis of the cylinder that is formed by the internal space 7. The shaft 3 rotates and accordingly causes a roller 9 that is located inside the compressor unit 5 to rotate. The refrigerant is compressed with rotation of the roller 9. Further, with rotation of the shaft 3, the refrigeration machine oil stored in the oil reservoir 8 is supplied to the compressor unit 5 through the inside (not illustrated) of the shaft 3.

The compressor unit 5 is arranged in a lower part of the internal space 7 and is arranged above the oil reservoir 8. The compressor 1 further includes an upper muffler cover 14 and a lower muffler cover 15. The upper muffler cover 14 is arranged above the compressor unit 5 in the internal space 7. In the upper muffler cover 14, an upper muffler chamber 16 is formed. The lower muffler cover 15 is arranged under the compressor unit 5 and above the lubricant reservoir 8 in the internal space 7. In the lower muffler cover 15, a lower muffler chamber 17 is formed. The lower muffler chamber 17 communicates with the upper muffler chamber 16 via a communication path (not illustrated) that is formed in the compressor unit 5. A compressed refrigerant discharge hole 18 is formed between the upper muffler cover 14 and the shaft 3. The upper muffler chamber 16 communicates with the internal space 7 via the compressed refrigerant discharge hole 18.

The compressor unit 5 is of what is called a rotary type, and the roller 9 rotates with rotation of the shaft 3. With rotation of the roller 9, the refrigerant supplied from the suction pipes 11 is compressed and the compressed refrigerant is supplied to the upper muffler chamber 16 and the lower muffler chamber 17. The refrigerant has compatibility with the refrigeration machine oil. The motor unit 6 is arranged above the compressor unit 5 in the internal space 7. The motor unit 6 includes a rotor 21 and a stator 22. The rotor 21 is fixed to the shaft 3. The stator 22 is formed in an approximately cylindrical shape, is arranged so as to surround the rotor 21, and is fixed to the housing 2. The stator 22 includes a coil 26. With appropriate application of single-phase voltage or three-phase voltage to the coil 26, the stator 22 generates a rotary magnetic field and causes the rotor 21 to rotate.

[Rotor 21]

Figure 2:
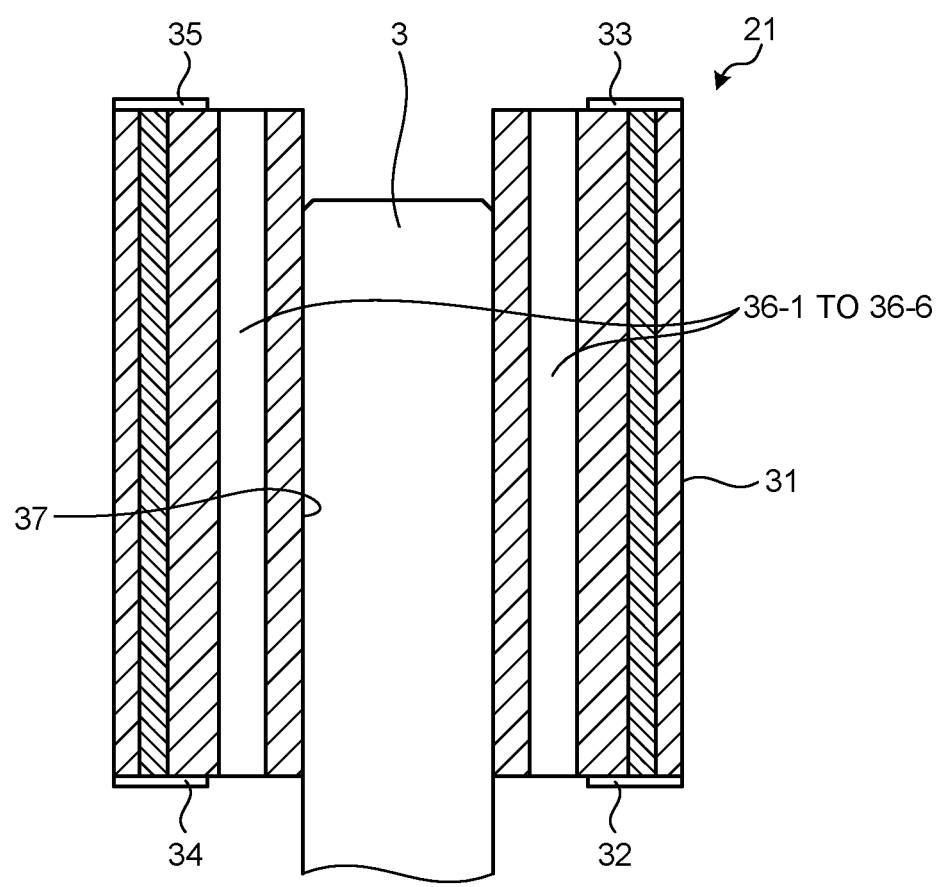
FIG. 2 is a cross-sectional view of a rotor of the compressor of the first embodiment.

FIG. 2 is a cross-sectional view of the rotor 21 of the compressor 1 of the first embodiment. As illustrated in FIG. 2, the rotor 21 includes a rotor core 31, a lower rotor edge plate 32, and an upper rotor edge plate 33. The rotor core 31 is formed in an approximately cylindrical shape and is formed by depositing a plurality of steel sheets, such as silicon steel sheets, formed of a soft magnetic material, for example. In the rotor core 31, a lower rotor end surface 34 and an upper rotor end surface 35 are formed. The lower rotor end surface 34 is formed in a portion corresponding to one bottom surface of a cylinder that is formed by the rotor core 31, and in a portion of the rotor core 31 facing the compressor unit 5. The upper rotor end surface 35 is formed in a portion corresponding to the other bottom surface of the cylinder that is formed by the rotor core 31, and in a portion opposite to a side on which the lower rotor end surface 34 is formed in the rotor core 31.

In the rotor core 31, a shaft hole 37 and a plurality of refrigerant holes 36-1 to 36-6 are further formed. The shaft hole 37 is formed so as to overlap with the central axis of the cylinder that is formed by the rotor core 31 and so as to penetrate through the lower rotor end surface 34 and the upper rotor end surface 35. The rotor core 31 is fixed to the shaft 3 in a state in which the shaft 3 penetrates through the shaft hole 37 and the shaft 3 is shrink-fit. The plurality of refrigerant holes 36-1 to 36-6 are formed so as to be parallel to the central axis of the rotor core 31 and so as to penetrate through the lower rotor end surface 34 and the upper rotor end surface 35.

The lower rotor edge plate 32 is firmly attached to the lower rotor end surface 34 of the rotor core 31 so as to cover the lower rotor end surface 34 and is fixed to the rotor core 31. The upper rotor edge plate 33 is formed in an approximately circular disc shape. The upper rotor edge plate 33 is firmly attached to the upper rotor end surface 35 of the rotor core 31 so as to cover the upper rotor end surface 35 and is fixed to the rotor core 31.

Figure 3:
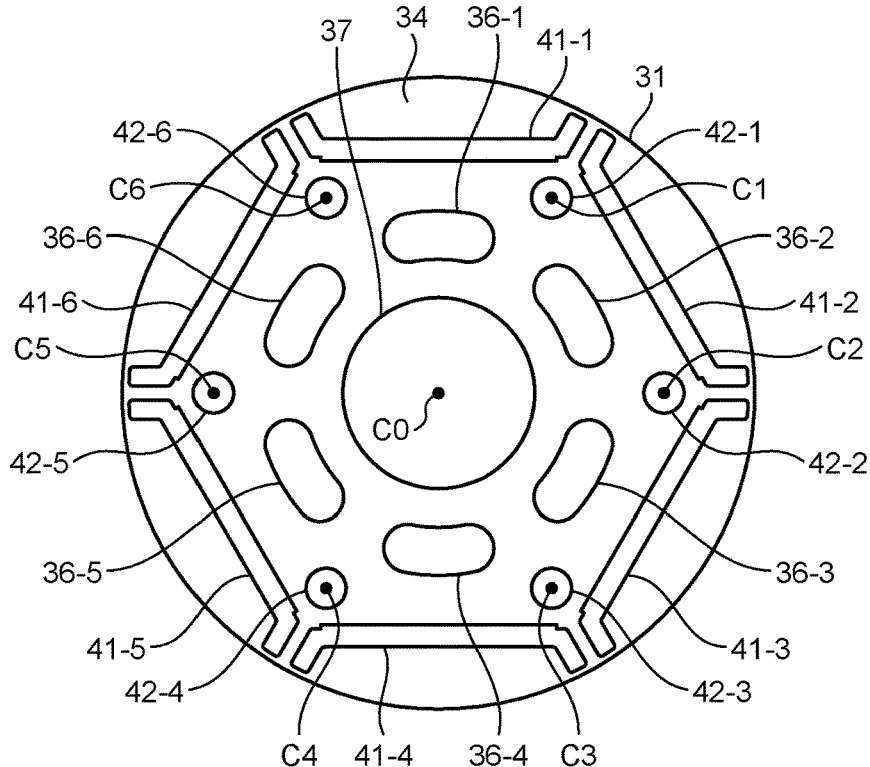
FIG. 3 is a plan view of a rotor core of the compressor of the first embodiment.

FIG. 3 is a plan view of the rotor core 31 of the compressor 1 of the first embodiment. As illustrated in FIG. 3, the plurality of refrigerant holes 36-1 to 36-6 are arranged at equal intervals around the shaft hole 37. In the rotor core 31, a plurality of magnet holes 41-1 to 41-6 and a plurality of rivet holes 42-1 to 42-6 are further formed. The plurality of magnet holes 41-1 to 41-6 are formed on radially outer sides located farther from the shaft hole 37 than the plurality of refrigerant holes 36-1 to 36-6. That is, the first magnet hole 41-1 among the plurality of magnet holes 41-1 to 41-6 is formed on the radially outer side of the first refrigerant hole 36-1 among the plurality of refrigerant holes 36-1 to 36-6. The second magnet hole 41-2 among the plurality of magnet holes 41-1 to 41-6 is formed on the radially outer side of the second refrigerant hole 36-2 among the plurality of refrigerant holes 36-1 to 36-6. The third magnet hole 41-3 among the plurality of magnet holes 41-1 to 41-6 is formed on the radially outer side of the third refrigerant hole 36-3 among the plurality of refrigerant holes 36-1 to 36-6. The fourth magnet hole 41-4 among the plurality of magnet holes 41-1 to 41-6 is formed on the radially outer side of the fourth refrigerant hole 36-4 among the plurality of refrigerant holes 36-1 to 36-6. The fifth magnet hole 41-5 among the plurality of magnet holes 41-1 to 41-6 is formed on the radially outer side of the fifth refrigerant hole 36-5 among the plurality of refrigerant holes 36-1 to 36-6. The sixth magnet hole 41-6 among the plurality of magnet holes 41-1 to 41-6 is formed on the radially outer side of the sixth refrigerant hole 36-6 among the plurality of refrigerant holes 36-1 to 36-6.

The plurality of rivet holes 42-1 to 42-6 are formed on the radially outer sides located farther from the shaft hole 37 than the plurality of refrigerant holes 36-1 to 36-6 and are formed on radially inner sides located closer to the shaft hole 37 than the plurality of magnet holes 41-1 to 41-6. The plurality of rivet holes 42-1 to 42-6 are formed on radially outer sides of partial regions that are adjacent to the plurality of refrigerant holes 36-1 to 36-6 in a circumferential direction such that circumferential positions of the plurality of rivet holes 42-1 to 42-6 do not overlap with circumferential positions of the plurality of refrigerant holes 36-1 to 36-6. That is, as more detailed description on the first rivet, hole 42-1 among the plurality of rivet holes 42-1 to 42-6, the first rivet hole 42-1 is formed such that a line segment connecting a center C1 of the first rivet hole 42-1 and a center C0 of the shaft hole 37 of the rotor core 31 passes between the first refrigerant hole 36-1 and the second refrigerant hole 36-2. The same applies to the second rivet hole 42-2. That is, the second rivet hole 42-2 is formed such that a line segment connecting a center C2 of the second rivet hole 42-2 and the center C0 of the shaft hole 37 of the rotor core 31 passes between the second refrigerant hole 36-2 and the third refrigerant hole 36-3. The same applies to the third rivet hole 42-3 to the sixth rivet hole 42-6 as described below. The third rivet hole 42-3 is formed such that a line segment connecting a center C3 of the third rivet hole 42-3 and the center C0 of the shaft hole 37 of the rotor core 31 passes between the third refrigerant hole 36-3 and the fourth refrigerant hole 36-4. The fourth rivet hole 42-4 is formed such that a line segment connecting a center C4 of the fourth rivet hole 42-4 and the center C0 of the shaft hole 37 of the rotor core 31 passes between the fourth refrigerant hole 36-4 and the fifth refrigerant hole 36-5. The fifth rivet hole 42-5 is formed such that a line segment connecting a center C5 of the fifth rivet hole 42-5 and the center C0 of the shaft hole 37 of the rotor core 31 passes between the fifth refrigerant hole 36-5 and the sixth refrigerant hole 36-6. The sixth rivet hole 42-6 is formed such that a line segment, connecting a center C6 of the sixth rivet hole 42-6 and the center C0 of the shaft hole 37 of the rotor core 31 passes between the sixth refrigerant hole 36-6 and the first refrigerant hole 36-1.

Figure 4:
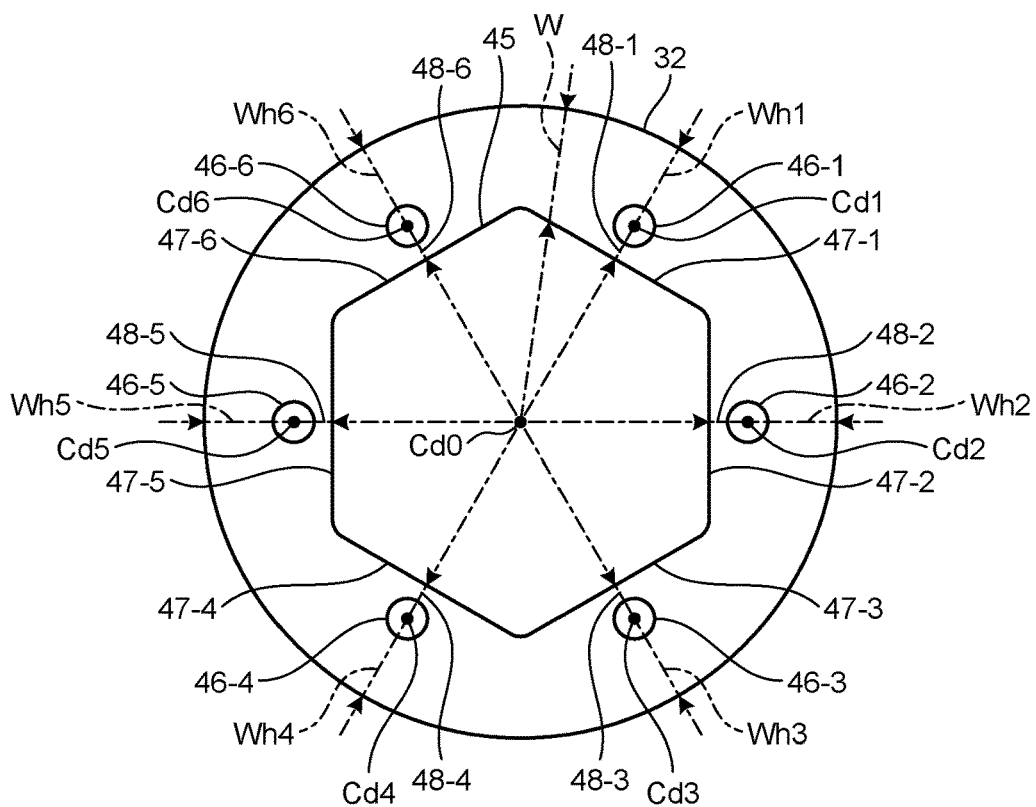
FIG. 4 is a plan view of a lower rotor edge plate of the compressor of the first embodiment.

FIG. 4 is a plan view of the lower rotor edge plate 32 of the compressor 1 of the first embodiment. As illustrated in FIG. 4, the lower rotor edge plate 32 is formed in an approximately circular disc shape. In the lower rotor edge plate 32, a central opening portion 45 and a plurality of rivet openings 46-1 to 46-6 (fixing member openings) are formed. The central opening portion 45 (opening) is formed in the center of the lower rotor edge plate 32. The plurality of rivet openings 46-1 to 46-6 are formed at equal intervals around the central opening portion 45.

In the lower rotor edge plate 32, the central opening portion 45 is formed by formation of a plurality of linear edges 47-1 to 47-6. The plurality of linear edges 47-1 to 47-6 form the edge of the central opening portion 45. The first linear edge 47-1 among the plurality of linear edges 47-1 to 47-6 is formed so as to be perpendicular to a line segment that connects a center Cd0 of the central opening portion 45 and a center Cd1 of the first rivet opening 46-1. Similarly, the second linear edge 47-2 among the plurality of linear edges 47-1 to 47-6 is formed so as to extend along a straight line perpendicular to a line segment that connects the center Cd0 of the central opening portion 45 and a center Cd2 of the second rivet opening 46-2. Similarly, the third linear edge 47-3 is formed so as to extend along a straight line perpendicular to a line segment that connects the center Cd0 of the central opening portion 45 and a center Cd3 of the third rivet opening 46-3. The fourth linear edge 47-4 is formed so as to extend along a straight line perpendicular to a line segment that connects the center Cd0 of the central opening portion 45 and a center Cd4 of the fourth rivet opening 46-4. The fifth linear edge 47-5 is formed so as to extend along a straight line perpendicular to a line segment that connects the center Cd0 of the central opening portion 45 and a center Cd5 of the fifth rivet opening 46-5. The sixth linear edge 47-6 is formed so as to extend along a straight line perpendicular to a line segment that connects the center Cd0 of the central opening portion 45 and a center Cd6 of the sixth rivet opening 46-6. That is, the edge of the central opening portion 45 is formed so as to extend along a regular hexagon that is a convex figure. Here, a chain line that radially extends from the center Cd0 of the central opening portion 45 is drawn, and a width of the lower rotor edge plate 32 on the chain line (hereinafter, referred to as a radial directional width) is denoted by W. A size of the radial directional width W of the lower rotor edge plate 32 varies by changing a position at which the chain line is drawn because the edge of the central opening portion 45 extends along the convex figure. That is, it is possible to form a portion in which the radial directional width W is reduced and a portion in which the radial directional width W is increased. The radial directional width W has a maximum size when set to a radial directional width Wh1 on a line segment that connects the center Cd0 of the central opening portion 45 and the center Cd1 of the first rivet opening 46-1. Similarly, radial directional widths Wh2 to Wh6 on respective line segments that connect the center Cd0 of the central opening portion 45 and the centers Cd2 to Cd6 have the maximum size.

The plurality of rivet holes 42-1 to 42-6 are provided in portions in which the radial directional widths W have the maximum size. Therefore, even when the plurality of rivet openings 46-1 to 46-6 are provided, it is possible to ensure long widths between the plurality of rivet openings 46-1 to 46-6 and the central opening portion 45. £ Hereinafter, gaps between the plurality of rivet openings 46-1 to 46-6 and the central opening portion 45 are referred to as thick portions. In the lower rotor edge plate 32, a plurality of thick portions 48-1 to 48-6 (separate portions) are formed. The plurality of thick portions 48-1 to 48-6 are formed between the central opening portion 45 and the plurality of rivet openings 46-1 to 46-6, and separate the central opening portion 45 and the plurality of rivet openings 46-1 to 46-6. That is, the first thick portion 48-1 among the plurality of thick portions 48-1 to 48-6 is formed between the central opening portion 45 and the first rivet opening 46-1 and separates the central opening portion 45 and the first rivet opening 46-1. The second thick portion 48-2 among the plurality of thick portions 48-1 to 48-6 is formed between the central opening portion 45 and the second rivet opening 46-2 and separates the central opening portion 45 and the second rivet opening 46-2. The third thick portion 48-3 among the plurality of thick portions 48-1 to 48-6 is formed between the central opening portion 45 and the third rivet opening 46-3 and separates the central opening portion 45 and the third rivet opening 46-3. The fourth thick portion 48-4 among the plurality of thick portions 48-1 to 48-6 is formed between the central opening portion 45 and the fourth rivet opening 46-4 and separates the central opening portion 45 and the fourth rivet opening 46-4. The fifth thick portion 48-5 among the plurality of thick portions 48-1 to 48-6 is formed between the central opening portion 45 and the fifth rivet opening 46-5 and separates the central opening portion 45 and the fifth rivet opening 46-5. The sixth thick portion 48-6 among the plurality of thick portions 48-1 to 48-6 is formed between the central opening portion 45 and the sixth rivet opening 46-6 and separates the central opening portion 45 and the sixth rivet opening 46-6.

Figure 5:
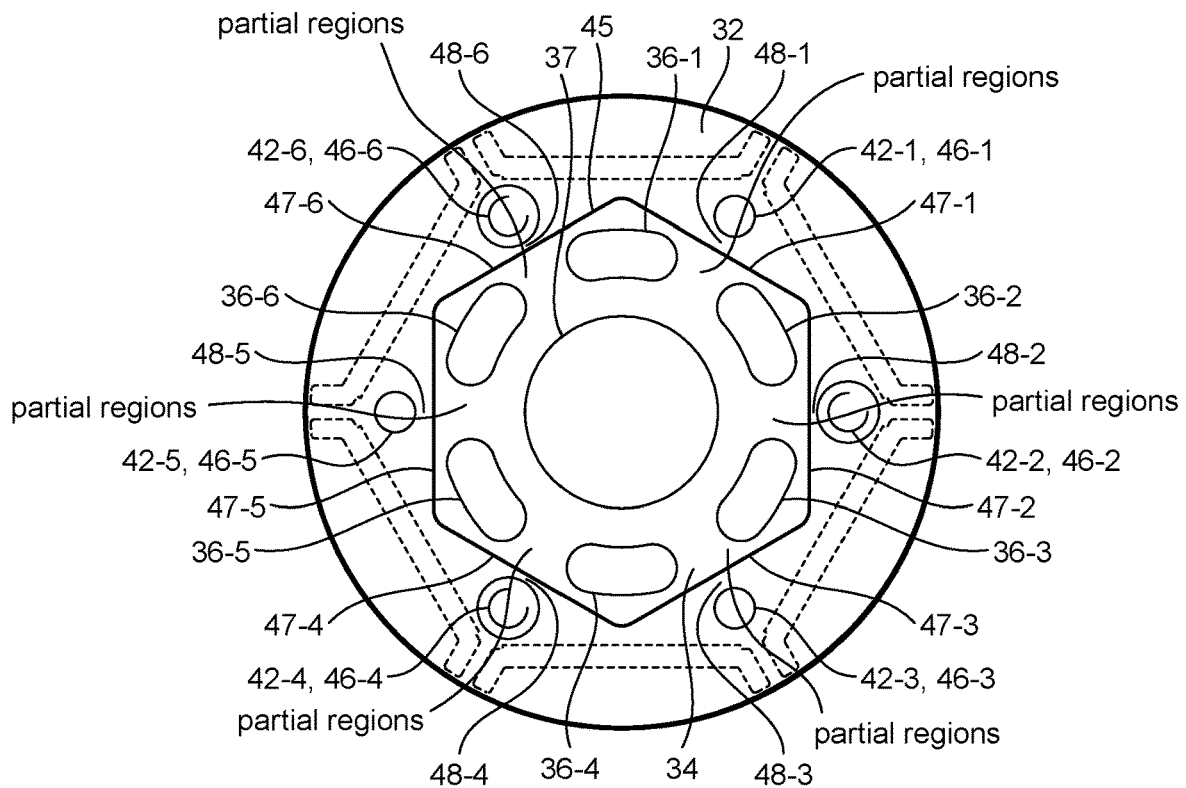
FIG. 5 is a plan view of a rotor in which the lower rotor edge plats of the compressor of the first embodiment is mounted on the rotor core.

FIG. 5 is a plan view of the rotor 21 of the compressor 1 of the first embodiment. As illustrated in FIG. 5, the lower rotor edge plate 32 is firmly attached to the lower rotor end surface 34 such that an outer periphery of the lower rotor edge plate 32 substantially overlaps with an outer periphery of the lower rotor end surface 34, and is mounted on the rotor core 31. The central opening portion 45 allows the shaft hole 37 and the plurality of refrigerant holes 36-1 to 36-6 to be exposed in the internal space 7 and allows the plurality of refrigerant holes 36-1 to 36-6 to communicate with the internal space 7 when the lower rotor edge plate 32 is appropriately mounted on the rotor core 31. Further, the central opening portion 45 allows regions between the shaft hole 37 and the plurality of refrigerant holes 36-1 to 36-6 on the lower rotor end surface 34 of the rotor core 31 to be exposed in the internal space 7. Furthermore, the central opening portion 45 is formed such that vertices of the regular hexagon formed by the central opening portion 45 are arranged on the radially outer sides of the plurality of refrigerant holes 36-1 to 36-6.

Moreover, the central opening portion 45 allows the partial regions that are adjacent, to the plurality of refrigerant holes 36-1 to 36-6 in the circumferential direction on the lower rotor end surface 34 to be exposed in the internal space 7. That is, the central opening portion 45 allows the region between the first refrigerant hole 36-1 and the second refrigerant hole 36-2 on the lower rotor end surface 34 to be exposed in the internal space 7. The central opening portion 45 allows the region between the second refrigerant hole 36-2 and the third refrigerant hole 36-3 on the lower rotor end surface 34 to be exposed in the internal space 7. The central opening portion 45 allows the region between the third refrigerant, hole 36-3 and the fourth refrigerant hole 36-4 on the lower rotor end surface 34 to be exposed in the internal space 7. The central opening portion 45 allows the region between the fourth refrigerant hole 36-4 and the fifth refrigerant hole 36-5 on the lower rotor end surface 34 to be exposed in the internal space 7. The central opening portion 45 allows the region between the fifth refrigerant hole 36-5 and the sixth refrigerant hole 36-6 in the lower rotor end surface 34 to be exposed in the internal space 7. The central opening portion 45 allows the region between the sixth refrigerant hole 36-6 and the first refrigerant hole 36-1 on the lower rotor end surface 34 to be exposed in the internal space 7.

The plurality of rivet, openings 46-1 to 46-6 communicate with the plurality of rivet holes 42-1 to 42-6 when the lower rotor edge plate 32 is appropriately mounted on the rotor core 31. The first rivet opening 46-1 communicates with the first rivet hole 42-1. The second rivet opening 46-2 communicates with the second rivet hole 42-2. The third rivet opening 46-3 communicates with the third rivet hole 42-3. The fourth rivet opening 46-4 communicates with the fourth rivet hole 42-4. The fifth rivet opening 46-5 communicates with the fifth rivet hole 42-5. The sixth rivet opening 46-6 communicates with the sixth rivet hole 42-6.

The upper rotor edge plate 33 is formed in the same manner as the lower rotor edge plate 32, that is, formed in an approximately circular disc shape, and, a central opening portion, a plurality of rivet openings, and a plurality of thick portions are formed in the upper rotor edge plate 33.

The rotor 21 includes a plurality of rivets (not illustrated). The plurality of rivets are inserted in the plurality of rivet holes 42-1 to 42-6 of the rotor core 31, penetrate through the plurality of rivet openings 46-1 to 46-6 of the lower rotor edge plate 32, and penetrate through the plurality of rivet openings of the upper rotor edge plate 33. The plurality of rivets (fixing members) are swaged by an end surface of the lower rotor, so that the lower rotor edge plate 32 and the upper rotor edge plate 33 are fixed to the rotor core 31 in a state in which the lower rotor edge plate 32 and the upper rotor edge plate 33 are appropriately mounted on the rotor core 31. With the fixation of the lower rotor edge plate 32 to the rotor core 31 as described above, stress is applied to peripheries of the plurality of rivet openings 46-1 to 46-6.

The rotor 21 further includes a plurality of permanent magnets (not illustrated). The plurality of permanent magnets are inserted in the plurality of magnet holes 41-1 to 41-6 and embedded in the rotor core 31. Both ends of each of the magnet holes 41-1 to 41-6 are closed when the lower rotor edge plate 32 and the upper rotor edge plate 33 are appropriately mounted on the rotor core 31. The plurality of permanent magnets are fixed to the rotor core 31 so as not to come off from the rotor core 31 because of closure of the both ends of each of the magnet holes 41-1 to 41-6 by the lower rotor edge plate 32 and the upper rotor edge plate 33. The plurality of permanent magnets generate heat when the rotor 21 is caused to rotate by the rotary magnetic field generated by the stator 22.

The plurality of thick portions 48-1 to 48-6 do not overlap with circumferential positions of the plurality of rivet holes 42-1 to 42-6 and the plurality of refrigerant holes 36-1 to 36-6, so that even when regions exposed in the internal space 7 on the radially outer sides of the plurality of refrigerant holes 36-1 to 36-6 are increased, it is not necessary to reduce widths in a radial direction in some cases. Further, because the regions exposed in the internal space 7 on the radially outer sides of the plurality of refrigerant holes 36-1 to 36-6 do not overlap with the circumferential positions of the plurality of rivet holes 42-1 to 42-6 and the plurality of refrigerant holes 36-1 to 36-6, it is not necessary to reduce widths in the radial direction even when widths of the plurality of thick portions 48-1 to 48-6 in the radial direction are increased.

The lower rotor edge plate 32 is formed such that the edge of the central opening portion 45 extends along straight lines, so that it is possible to relatively increase the widths of the plurality of thick portions 48-1 to 48-6 in the radial direction. By increasing the widths of the plurality of thick portions 48-1 to 48-6 in the radial direction in the lower rotor edge plate 32, strength of the plurality of thick portions 48-1 to 48-6 increase. With increase in strength of the lower rotor edge plate 32, it is possible to improve durability of the plurality of thick portions 48-1 to 48-6, so that it is possible to prevent the plurality of thick portions 48-1 to 48-6 from being broken.

The upper rotor edge plate 33 is formed in the same manner as the lower rotor edge plate 32, so that it is possible to increase widths of a plurality of thick portions in the radial direction, improve durability of the plurality of thick portions, and prevent the plurality of thick portions from being broken. That is, in the compressor 1, by increasing the widths of the plurality of thick portions of the upper rotor edge plate 33 in the radial direction in the same manner as in the lower rotor edge plate 32, it is possible to ensure strength of the upper rotor edge plate 33.

In the rotor 21, by appropriately mounting the lower rotor edge plate 32 and the upper rotor edge plate 33 on the rotor core 31, a plurality of refrigerant flow passages for connecting an upper part and a lower part of the motor unit 6 are formed. The plurality of refrigerant flow passages are formed by allowing the plurality of refrigerant holes 36-1 to 36-6 to communicate with the central opening portion 45 and the central opening portion of the upper rotor edge plate 33.

[Operation of Compressor 1]

The compressor 1 is arranged in a refrigeration cycle equipment (not illustrated), and used to compress a refrigerant and circulate the refrigerant in the refrigeration cycle equipment. The motor unit 6 of the compressor 1 generates a rotary magnetic field when three-phase voltage is applied to the coil 26 of the stator 22. The rotor 21 is caused to rotate by the rotary magnetic field generated by the stator 22. The motor unit 6 causes the shaft 3 to rotate with rotation of the rotor 21.

The compressor unit 5, upon rotation of the shaft 3, sucks low-pressure refrigerant gas via the suction pipes 11, compresses the sucked low-pressure refrigerant gas to generate high-pressure refrigerant gas, and supplies the high-pressure refrigerant gas to the upper muffler chamber 16 and the lower muffler chamber 17. The lower muffler cover 15 reduces pressure pulsation of the high-pressure refrigerant gas supplied to the lower muffler chamber 17, and supplies the high-pressure refrigerant gas with the reduced pressure pulsation to the upper muffler chamber 16. The upper muffler cover 14 reduces pressure pulsation of the high-pressure refrigerant gas supplied to the upper muffler chamber 16, and supplies the high-pressure refrigerant gas with the reduced pressure pulsation to a space between the compressor unit 5 and the motor unit 6 in the internal space 7 via the compressed refrigerant discharge hole 18. The high-pressure refrigerant gas supplied to the space between the compressor unit 5 and the motor unit 6 in the internal space 7 passes through the plurality of refrigerant flow passages formed in the rotor 21, and is supplied to a space above the motor unit 6 in the internal space 7. The refrigerant supplied to the space above the motor unit 6 in the internal space 7 is discharged to a device (for example, heat exchanger) that is arranged on a downstream side of the compressor 1 in the refrigeration cycle equipment via the discharge pipe 12.

The lower rotor edge plate 32 allows regions that are adjacent to the plurality of refrigerant holes 36-1 to 36-6 on the lower rotor end surface 34 to be exposed in the internal space 7 via the central opening portion 45. In the lower rotor edge plate 32 of the present embodiment, the vertices of the regular hexagon of the central opening portion 45 are arranged on the radially outer sides of the plurality of refrigerant holes 36-1 to 36-6, so that it is possible to increase the widths of the plurality of thick portions 48-1 to 48-6 in the radial direction to thereby increase the strength, and allow the regions adjacent to the plurality of refrigerant holes 36-1 to 36-6 on the lower rotor end surface 34 to be largely exposed. Flow passage resistance of the plurality of refrigerant flow passages is reduced because the regions adjacent to the plurality of refrigerant holes 36-1 to 36-6 on the lower rotor end surface 34 are exposed in the internal space 7.

The upper rotor edge plate 33 allows regions that are adjacent to the plurality of refrigerant holes 36-1 to 36-6 on the upper rotor end surface 35 to be exposed in the internal space 7 via the central opening portion. In the upper rotor edge plate 33, vertices of the regular hexagon of the central opening portion are arranged on the radially outer sides of the plurality of refrigerant holes 36-1 to 36-6, so that it is possible to allow regions on the radially outer sides of the plurality of refrigerant holes 36-1 to 36-6 on the upper rotor end surface 35 to be largely exposed. Flow passage resistance of the plurality of refrigerant flow passages is relatively reduced because the regions adjacent to the plurality of refrigerant holes 36-1 to 36-6 on the upper rotor end surface 35 are exposed in the internal space 7.

The compressor 1 is able to reduce pressure loss that occurs when the high-pressure refrigerant gas passes through the plurality of refrigerant flow passages because the flow passage resistance of the plurality of refrigerant flow passages is small. By reducing the pressure loss that occurs when the high-pressure refrigerant gas passes through the plurality of refrigerant flow passages, the compressor 1 is able to prevent reduction of pressure of the refrigerant that is discharged to a device on a subsequent stage and highly effectively compress the refrigerant.

[Compressor of First Comparative Example]

Figure 6:
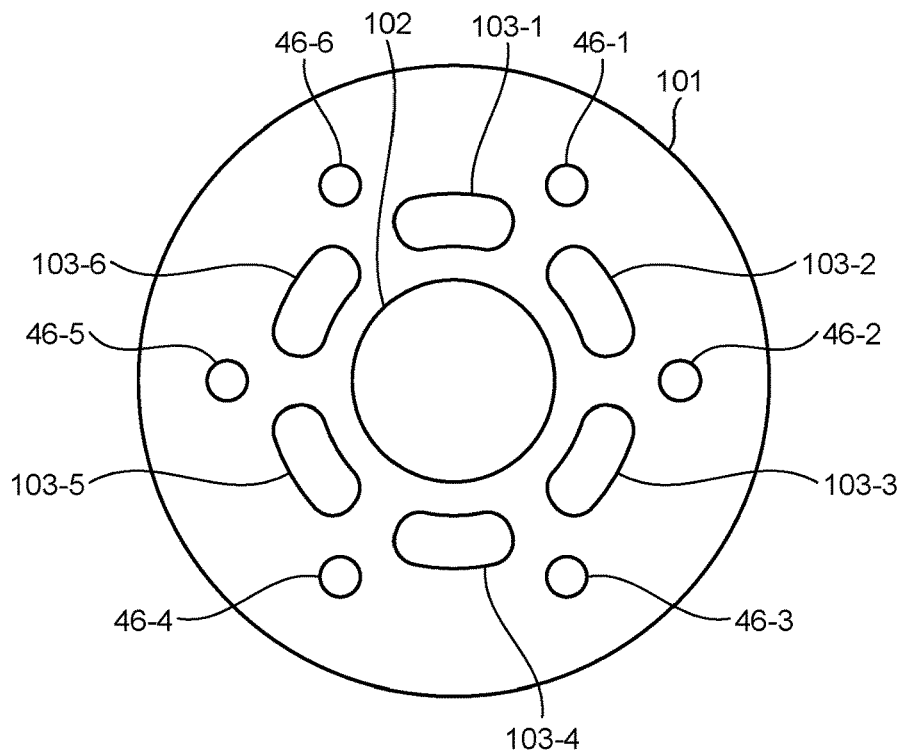
FIG. 6 is a plan view of a lower rotor edge plate of a compressor of a first comparative example.

A compressor of a first comparative example is configured such that the lower rotor edge plate 32 of the compressor 1 of the first embodiment described above is replaced with a different lower rotor edge plate, and the upper rotor edge plate 33 is replaced with a different upper rotor edge plate. FIG. 6 is a plan view of a lower rotor edge plate 101 of the compressor of the first comparative example. In the lower rotor edge plate 101 of the compressor of the first comparative example, as illustrated in FIG. 6, a shaft opening 102 and a plurality of refrigerant openings 103-1 to 103-6 are formed. The shaft opening 102 is formed in the center of the lower rotor edge plats 101. The plurality of refrigerant openings 103-1 to 103-6 are formed at equal intervals around the shaft opening 102. In the lower rotor edge plate 101, a plurality of rivet openings 46-1 to 46-6 are formed in the same manner as in the lower rotor edge plate 32. The plurality of rivet openings 46-1 to 46-6 are formed on the radially outer sides of the plurality of refrigerant openings 103-1 to 103-6.

Figure 7:
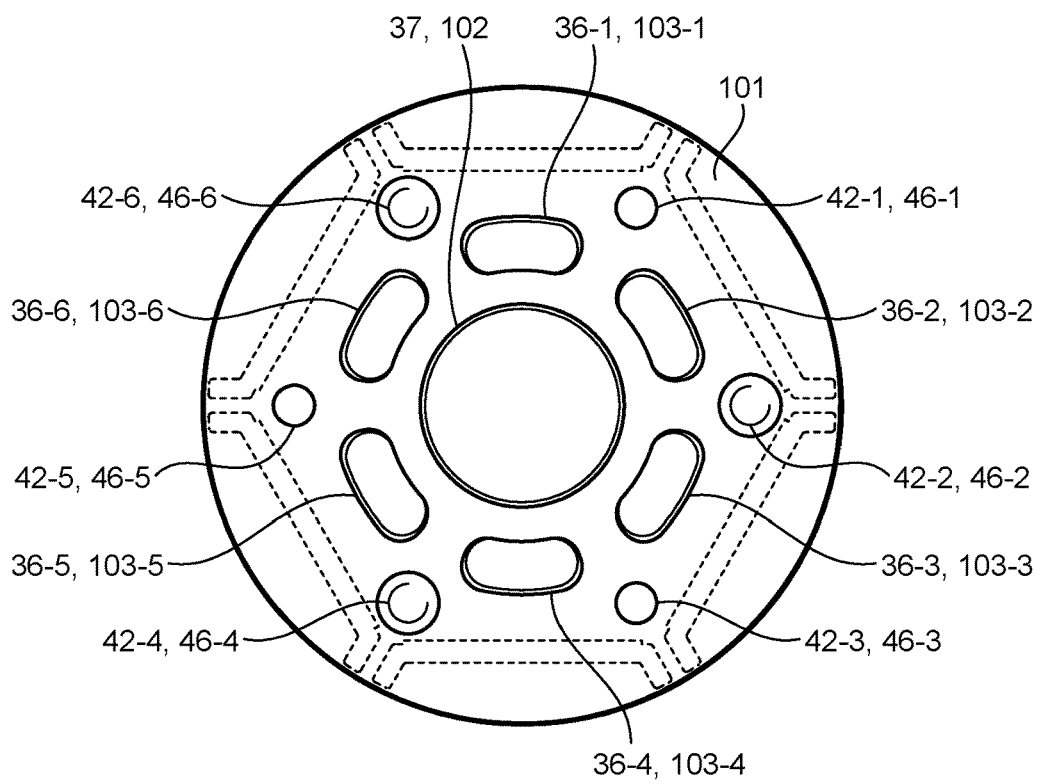
FIG. 7 is a plan view of a rotor in which the lower rotor edge plats of the compressor of the first comparative example is mounted on a rotor core.

FIG. 7 is a plan view of a rotor in which the lower rotor edge plate 101 of the compressor of the first comparative example is mounted on the rotor core 31. As illustrated in FIG. 7, the lower rotor edge plate 101 is firmly attached to the lower rotor end surface 34 such that an outer periphery of the lower rotor edge plate 101 substantially overlaps with an outer periphery of the lower rotor end surface 34, and is mounted on the rotor core 31. The plurality of rivet openings 46-1 to 46-6 communicate with the plurality of rivet holes 42-1 to 42-6 when the lower rotor edge plate 101 is appropriately mounted on the rotor core 31. The lower rotor edge plate 101 is fixed to the rotor core 31 by a plurality of rivets that penetrate through the plurality of rivet openings 46-1 to 46-6 in the same manner as the lower rotor edge plate 32.

The shaft opening 102 is formed such that an edge of the shaft opening 102 overlaps with an edge of the shaft hole 37 of the rotor core 31 when the lower rotor edge plate 101 is appropriately mounted on the rotor core 31. The plurality of refrigerant openings 103-1 to 103-6 are formed so as to communicate with the plurality of refrigerant holes 36-1 to 36-6 when the lower rotor edge plate 101 is appropriately mounted on the rotor core 31. Further, in the lower rotor edge plate 101, the plurality of refrigerant openings 103-1 to 103-6 are formed so as to cover the regions adjacent to the plurality of refrigerant holes 36-1 to 36-6 on the lower rotor end surface 34.

In the compressor of the first comparative example, an upper rotor edge plate is formed in the same manner as the lower rotor edge plate 101. In the lower rotor edge plats 101, the number of openings is larger than the number of openings in the lower rotor edge plate 32 of the compressor 1 of the first embodiment as described above. In the lower rotor edge plate 32 of the compressor 1 of the first embodiment, because the number of openings is smaller than the number of openings in the lower rotor edge plate 101, it is possible to reduce processing man-hours and reduce manufacturing costs.

In the rotor of the compressor of the first comparative example, by appropriately mounting the lower rotor edge plate 101 and the upper rotor edge plate on the rotor core 31, a plurality of refrigerant flow passages for connecting an upper part and a lower part of the motor unit 6 are formed in the same manner as in the rotor 21 of the compressor 1 of the first embodiment. The plurality of refrigerant flow passages are formed by allowing the plurality of refrigerant holes 36-1 to 36-6 to communicate with the plurality of refrigerant openings 103-1 to 103-6 and allowing the plurality of refrigerant holes 36-1 to 36-6 to communicate with the plurality of refrigerant openings on the upper rotor edge plate. Substantial lengths of the plurality of refrigerant flow passages of the compressor of the first comparative example are longer than the lengths of the plurality of refrigerant flow passages of the compressor 1 of the first embodiment because the regions adjacent to the plurality of refrigerant holes 36-1 to 36-6 on the lower rotor end surface 34 are covered by the lower rotor edge plate 101. Further, the substantial lengths of the plurality of refrigerant flow passages of the compressor of the first comparative example are longer than the lengths of the plurality of refrigerant flow passages of the compressor 1 of the first embodiment also because the regions adjacent to the plurality of refrigerant holes 36-1 to 36-6 on the upper rotor end surface 35 are covered by the upper rotor edge plate. Therefore, flow passage resistance of the plurality of refrigerant flow passages of the compressor of the first comparative example is larger than the flow passage resistance of the plurality of refrigerant flow passages of the compressor 1 of the first embodiment.

In the compressor 1 of the first embodiment, the flow passage resistance of the plurality of refrigerant flow passages is smaller as compared to the compressor of the first comparative example, so that it is possible to reduce pressure loss that occurs when the refrigerant passes through the plurality of refrigerant flow passages. Because the pressure loss of the plurality of refrigerant flow passages is smaller as compared to the compressor of the first comparative example, the compressor 1 of the first embodiment is able to prevent reduction of pressure of the refrigerant that is discharged to a device on a subsequent stage and highly effectively compress the refrigerant.

[Effects of Compressor 1 of First Embodiment]

The compressor 1 of the first embodiment includes the rotor 21, the stator 22 that causes the rotor 21 to rotate about a rotation axis, the compressor unit 5 that compresses a refrigerant with rotation of the rotor 21, and the housing 2 in which the internal space 7 for storing the rotor 21, the stator 22, and the compressor unit 5 is formed. The rotor 21 includes the rotor core 31 that is formed in a cylindrical shape and has the upper rotor end surface 35 and the lower rotor end surface 34, the lower rotor edge plate 32 that covers the lower rotor end surface 34, and a plurality of rivets for fixing the lower rotor edge plate 32 to the rotor core 31. In the rotor core 31, the plurality of refrigerant holes 36-1 to 36-6 through which the refrigerant passes are formed. In the lower rotor edge plats 32, the central opening portion 45 that allows the plurality of refrigerant holes 36-1 to 36-6 to communicate with the internal space 7, and the plurality of rivet openings 46-1 to 46-6 through which the plurality of rivets penetrate are formed. In this state, in the lower rotor edge plats 32, the plurality of thick portions 48-1 to 48-6 are formed between the central opening portion 45 and the plurality of rivet openings 46-1 to 46-6. In the compressor 1 as described above, with the formation of the plurality of thick portions 48-1 to 48-6, it is possible to form the central opening portion 45 through which the refrigerant passes, and ensure the strength of the lower rotor edge plate 32.

Further, the rotor 21 includes the upper rotor edge plate 33 that covers the upper rotor end surface 35. In the upper rotor edge plate 33, the central opening portion that allows the plurality of refrigerant holes 36-1 to 36-6 to communicate with the internal space 7 and the plurality of rivet openings through which the plurality of rivets penetrate are formed. In this state, in the upper rotor edge plate 33, the plurality of thick portions are formed between the central opening portion and the plurality of rivet openings. In the compressor 1 as described above, with the formation of the plurality of thick portions on the upper rotor edge plate 33, it is possible to form the central opening portion through which the refrigerant passes, and ensure the strength of the upper rotor edge plate 33.

Meanwhile, in the compressor 1 of the first embodiment, the plurality of thick portions are formed on both of the lower rotor edge plate 32 and the upper rotor edge plate 33, but the present invention is not limited to this example. For example, in some cases, it may be sufficient to form the thick portions in only one of the lower rotor edge plate 32 and the upper rotor edge plate 33 because edge plate thicknesses of the lower rotor edge plate 32 and the upper rotor edge plate 33 in an axial direction are different or materials of the edge plates are different. In this case, it may be possible to form a plurality of thick portions in only one of the lower rotor edge plate 32 and the upper rotor edge plate 33. Even in this case, in the compressor 1 of the first embodiment, it is possible to form the central opening portion through which the refrigerant passes, and ensure the strength of the edge plate in which the plurality of thick portions are formed.

Further, the central opening portion 45 of the compressor 1 of the first embodiment allows the plurality of refrigerant holes 36-1 to 36-6 and the partial regions that are adjacent to the plurality of refrigerant holes 36-1 to 36-6 in the circumferential direction on the lower rotor end surface 34 to be exposed in the internal space 7. In the compressor 1 as described above, by allowing the partial regions to be exposed in the internal space 7, it is possible to reduce lengths of the plurality of refrigerant holes 36-1 to 36-6 of the rotor 21 in the axial direction, so that it is possible to reduce the flow passage resistance of the refrigerant flow passage. In the compressor 1, by reducing the flow passage resistance of the plurality of refrigerant flow passages, it is possible to reduce pressure loss that occurs when the refrigerant passes through the plurality of refrigerant flow passages, prevent reduction of pressure of the refrigerant that is discharged to a device on a subsequent stage, and highly effectively compress the refrigerant.

Furthermore, the plurality of rivet openings 46-1 to 46-6 of the compressor 1 of the first embodiment are arranged on the radially outer sides of the partial regions. In the compressor 1 as described above, the plurality of rivet openings 46-1 to 46-6 are arranged on the radially outer sides of the partial regions that are adjacent to the plurality of refrigerant holes 36-1 to 36-6 in the circumferential direction. With this configuration, it is possible to ensure the widths of the plurality of thick portions 48-1 to 48-6. In the compressor 1, it is possible to increase the strength of the lower rotor edge plate 32 by ensuring the widths of the plurality of thick portions 48-1 to 48-6.

Moreover, the central opening portion 45 of the compressor 1 of the first embodiment is formed such that the edge of the central opening portion 45 extends along a polygon. In this case, the vertices of the polygon are arranged on the radially outer sides of the plurality of refrigerant holes 36-1 to 36-6. In the compressor 1 as described above, it is possible to allow the regions adjacent to the plurality of refrigerant holes 36-1 to 36-6 on the lower rotor end surface 34 to be largely exposed in the internal space 7, so that it is possible to further reduce the flow passage resistance of the plurality of refrigerant flow passages formed in the rotor 21.

Second Embodiment

Figure 8:
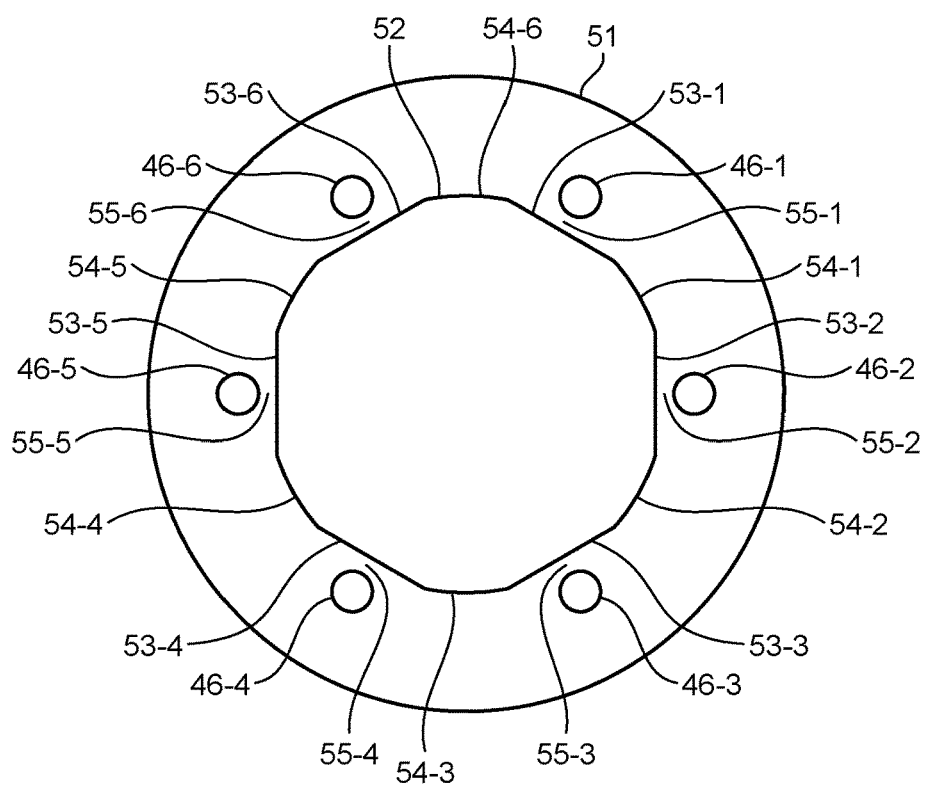
FIG. 8 is a plan view of a lower rotor edge plate of a compressor of a second embodiment.

A compressor of a second embodiment is configured such that the lower rotor edge plate 32 of the compressor 1 of the first embodiment described above is replaced with a different lower rotor edge plate, and the upper rotor edge plate 33 is replaced with a different upper rotor edge plate. FIG. 8 is a plan view of a lower rotor edge plate 51 of the compressor of the second embodiment. As illustrated in FIG. 8, in the lower rotor edge plate 51, the central opening portion 45 of the lower rotor edge plate 32 of the compressor 1 of the first embodiment described above is replaced with a different central opening portion 52 and other portions are the same as those of the lower rotor edge plate 32. That is, in the lower rotor edge plate 51, the plurality of rivet openings 46-1 to 46-6 are formed in the same manner as in the lower rotor edge plate 32. The central opening portion 52 is formed in the center of the lower rotor edge plate 51 such that edges of the central opening portion 52 extend along a convex figure.

In the central opening portion 52, a plurality of linear edges 53-1 to 53-6 and a plurality of curved edges 54-1 to 54-6 are formed with formation of the central opening portion 52. The plurality of linear edges 53-1 to 53-6 and the plurality of curved edges 54-1 to 54-6 form the edge of the central opening portion 52. The first linear edge 53-1 among the plurality of linear edges 53-1 to 53-6 is formed so as to extend along a straight line perpendicular to a line segment that connects a center of the lower rotor edge plate 51 and a center of the first rivet opening 46-1. The second linear edge 53-2 among the plurality of linear edges 53-1 to 53-6 is formed so as to extend along a straight line perpendicular to a line segment that connects the center of the lower rotor edge plate 51 and a center of the second rivet opening 46-2. The third linear edge 53-3 among the plurality of linear edges 53-1 to 53-6 is formed so as to extend along a straight line perpendicular to a line segment that connects the center of the lower rotor edge plate 51 and a center of the third rivet opening 46-3. The fourth linear edge 53-4 among the plurality of linear edges 53-1 to 53-6 is formed so as to extend along a straight line perpendicular to a line segment that connects the center of the lower rotor edge plate 51 and a center of the fourth rivet opening 46-4. The fifth linear edge 53-5 among the plurality of linear edges 53-1 to 53-6 is formed so as to extend along a straight line perpendicular to a line segment that connects the center of the lower rotor edge plate 51 and a center of the fifth rivet opening 46-5. The sixth linear edge 53-6 among the plurality of linear edges 53-1 to 53-6 is formed so as to extend along a straight line perpendicular to a line segment that connects the center of the lower rotor edge plate 51 and a center the sixth rivet opening 46-6.

The first curved edge 54-1 among the plurality of curved edges 54-1 to 54-6 is formed between the first linear edge 53-1 and the second linear edge 53-2, and extends along an arc centered at the center of the lower rotor edge plate 51. The second curved edge 54-2 among the plurality of curved edges 54-1 to 54-6 is formed between the second linear edge 53-2 and the third linear edge 53-3, and extends along an arc centered at the center of the lower rotor edge plate 51. The third curved edge 54-3 among the plurality of curved edges 54-1 to 54-6 is formed between the third linear edge 53-3 and the fourth linear edge 53-4, and extends along an arc centered at the center of the lower rotor edge plate 51. The fourth curved edge 54-4 among the plurality of curved edges 54-1 to 54-6 is formed between the fourth linear edge 53-4 and the fifth linear edge 53-5, and extends along an arc centered at the center of the lower rotor edge plate 51. The fifth curved edge 54-5 among the plurality of curved edges 54-1 to 54-6 is formed between the fifth linear edge 53-5 and the sixth linear edge 53-6, and extends along an arc centered at the center of the lower rotor edge plate 51. The sixth curved edge 54-6 among the plurality of curved edges 54-1 to 54-6 is formed between the sixth linear edge 53-6 and the first linear edge 53-1, and extends along an arc centered at the center of the lower rotor edge plate 51.

In the lower rotor edge plate 51, a plurality of thick portions 55-1 to 55-6 (separation portions) are further formed. The plurality of thick portions 55-1 to 55-6 are formed between the central opening portion 52 and the plurality of rivet openings 46-1 to 46-6, and separate the central opening portion 52 and the plurality of rivet openings 46-1 to 46-6.

Figure 9:
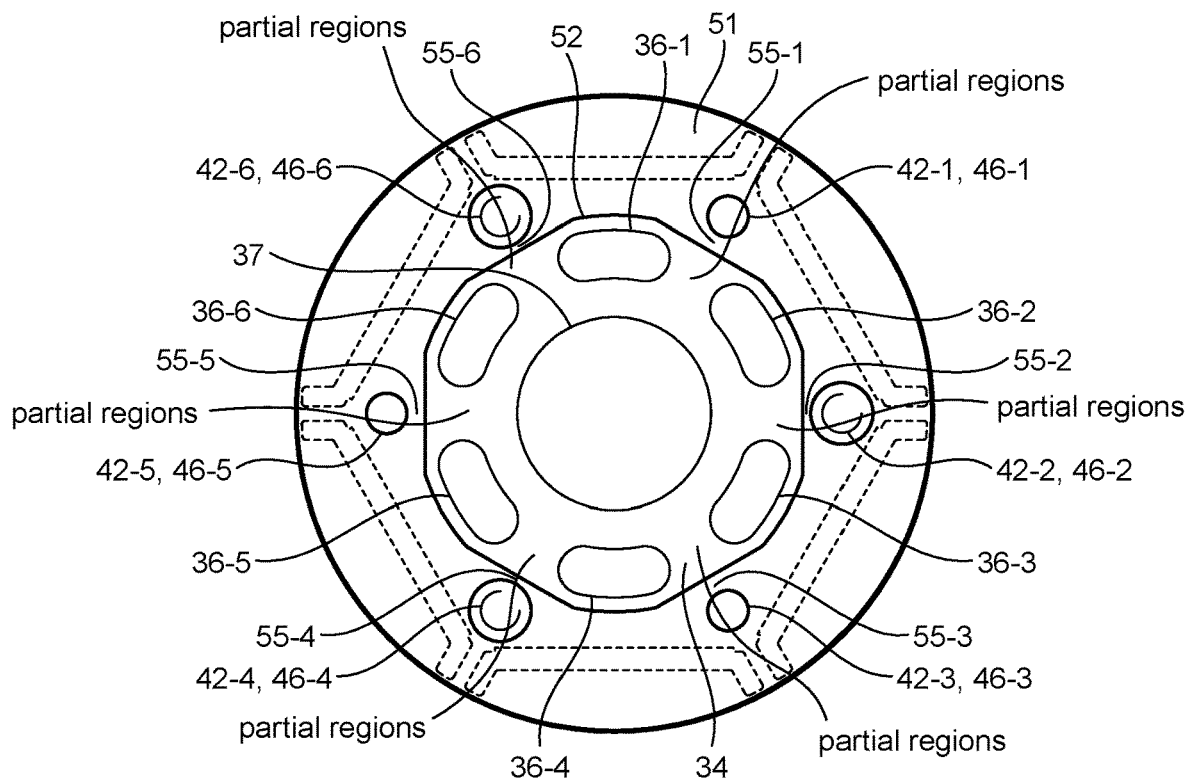
FIG. 9 is a plan view of a rotor in which the lower rotor edge plats of the compressor of the second embodiment is mounted on a rotor core.

FIG. 9 is a plan view of a rotor in which the lower rotor edge plate 51 of the compressor of the second embodiment is mounted on the rotor core 31. As illustrated in FIG. 9, the central opening portion 52 allows the plurality of refrigerant holes 36-1 to 36-6 and the shaft hole 37 to communicate with the internal space 7 when the lower rotor edge plate 51 is appropriately mounted on the rotor core 31. Further, the central opening portion 52 allows regions between the shaft hole 37 and the plurality of refrigerant holes 36-1 to 36-6 on the lower rotor end surface 34 to be exposed in the internal space 7. Furthermore, the central opening portion 52 allows partial regions that are adjacent to the plurality of refrigerant holes 36-1 to 36-6 in the circumferential direction on the lower rotor end surface 34 to be exposed in the internal space 7. Moreover, the central opening portion 52 allows regions that are adjacent to the plurality of refrigerant holes 36-1 to 36-6 on the radially outer sides on the lower rotor end surface 34 to be exposed in the internal space 7.

The lower rotor edge plate 51 allows the regions adjacent to the plurality of refrigerant holes 36-1 to 36-6 on the lower rotor end surface 34 to be exposed in the internal space 7 in the same manner as the lower rotor edge plate 32 as described above, so that it is possible to reduce the flow passage resistance of the plurality of refrigerant flow passages formed in the rotor. With the formation of the plurality of thick portions 55-1 to 55-6 in the same manner as in the lower rotor edge plate 32 as described above, it is possible to increase strength of the lower rotor edge plate 51.

An upper rotor edge plate of the compressor of the second embodiment is formed in the same manner as the lower rotor edge plate 51. Therefore, in the upper rotor edge plate, it is possible to reduce the flow passage resistance of the plurality of refrigerant flow passages formed in the rotor and increase strength in the same manner as in the lower rotor edge plate 51.

In the compressor of the second embodiment, a part of the edge of the central opening portion 52 is formed by the plurality of curved edges 54-1 to 54-6, so that while the regions that are exposed on the radially outer sides of the plurality of refrigerant holes 36-1 to 36-6 on the lower rotor end surface 34 are smaller than those of the first embodiment, strength of the rotor edge plate is increased.

Third Embodiment

Figure 10:
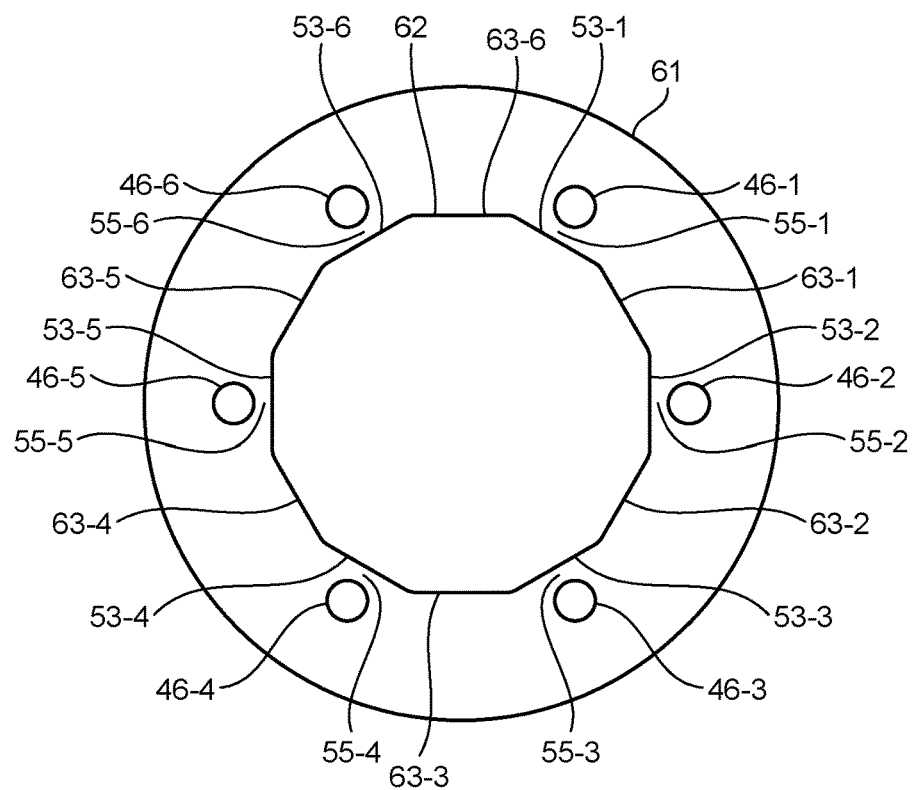
FIG. 10 is a plan view of a lower rotor edge plate of a compressor of a third embodiment.

A compressor of a third embodiment is configured such that the lower rotor edge plate 51 of the compressor of the second embodiment described above is replaced with a different lower rotor edge plate 61, and the upper rotor edge plate is replaced with a different upper rotor edge plate. FIG. 10 is a plan view of the lower rotor edge plate 61 of the compressor of the third embodiment. As illustrated in FIG. 10, in the lower rotor edge plate 61, the central opening portion 52 of the lower rotor edge plate 51 of the compressor of the second embodiment described above is replaced with a central opening portion 62. The central opening portion 62 is formed in the center of the lower rotor edge plate 61.

In the central opening portion 62, the plurality of curved edges 54-1 to 54-6 of the central opening portion 52 of the compressor of the second embodiment described above are replaced with a plurality of linear edges 63-1 to 63-6. That is, the edge of the central opening portion 62 is formed by the plurality of linear edges 53-1 to 53-6 and the plurality of linear edges 63-1 to 63-6. Therefore, in the lower rotor edge plate 61, the plurality of thick portions 55-1 to 55-6 are formed in the same manner as in the lower rotor edge plate 51. Each of the linear edges 63-1 to 63-6 is formed so as to extend along a straight line. That is, the edge of the central opening portion 62 is formed so as to extend along a dodecagon that 13 a convex figure.

Figure 11:
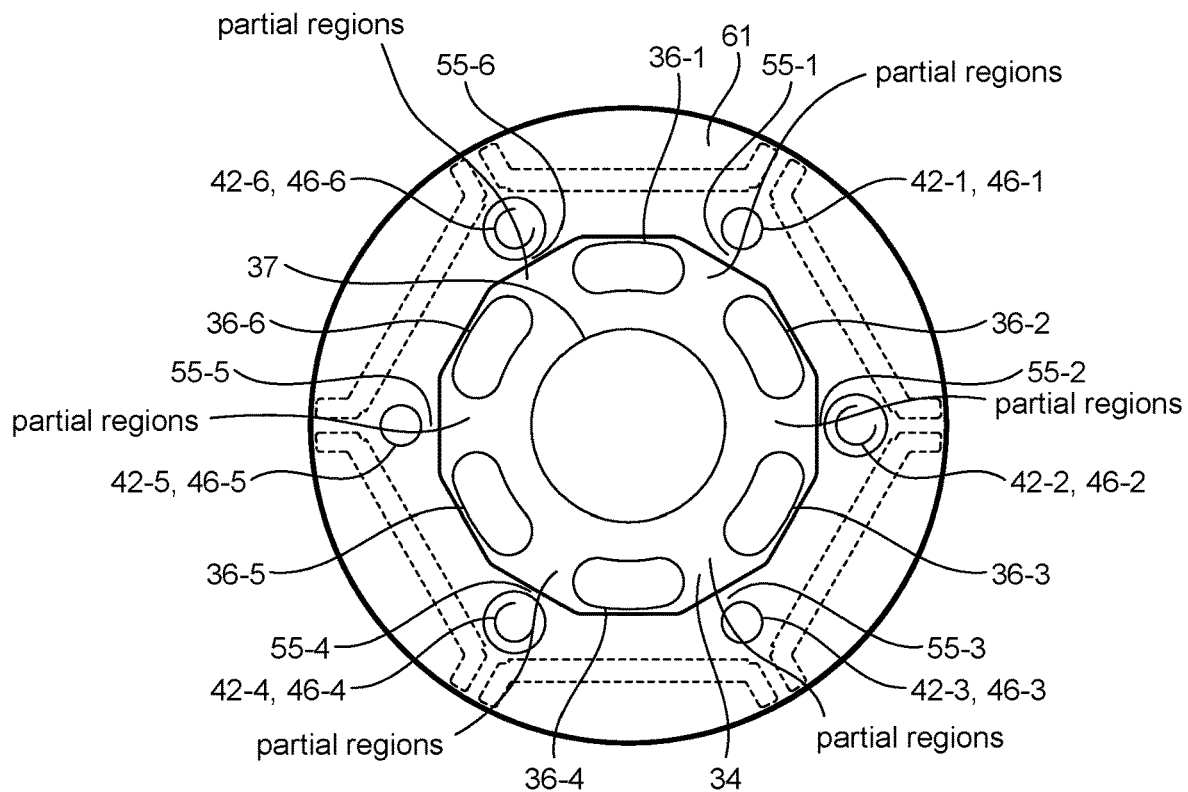
FIG. 11 is a plan view of a rotor in which the lower rotor edge plats of the compressor of the third embodiment is mounted on a rotor core.

FIG. 11 is a plan view of a rotor in which the lower rotor edge plate 61 of the compressor of the third embodiment is mounted on the rotor core 31. As illustrated in FIG. 11, the central opening portion 62 allows the plurality of refrigerant holes 36-1 to 36-6 and the shaft hole 37 to communicate with the internal space 7 when the lower rotor edge plate 61 is appropriately mounted on the rotor core 31. Further, the central opening portion 52 allows regions that are adjacent to the plurality of refrigerant holes 36-1 to 36-6 on the lower rotor end surface 34 to be exposed in the internal space 7, and allows partial regions that, are adjacent to the plurality of refrigerant holes 36-1 to 36-6 in the circumferential direction on the lower rotor end surface 34 to be exposed in the internal space 7.

The lower rotor edge plate 61 allows the regions adjacent to the plurality of refrigerant holes 36-1 to 36-6 on the lower rotor end surface 34 to be exposed in the internal space 7 in the same manner as the lower rotor edge plate 32 as described above, so that it is possible to reduce the flow passage resistance of the plurality of refrigerant flow passages formed in the rotor. With the formation of the plurality of thick portions 55-1 to 55-6 in the same manner as in the lower rotor edge plate 51 as described above, it is possible to increase strength of the lower rotor edge plate 61.

An upper rotor edge plate of the compressor of the third embodiment is formed in the same manner as the lower rotor edge plate 61, where regions that are adjacent to the plurality of refrigerant holes 36-1 to 36-6 on the upper rotor end surface 35 are exposed in the internal space 7 and a plurality of thick portions are formed. Therefore, in the upper rotor edge plate, it is possible to reduce the flow passage resistance of the plurality of refrigerant flow passages formed in the rotor in the same manner as the lower rotor edge plate 61.

In the compressor of the third embodiment, a part of the edge of the central opening portion 62 is formed by the plurality of linear edges 63-1 to 63-6, so that while the regions that are exposed on the radially outer sides of the plurality of refrigerant holes 36-1 to 36-6 on the lower rotor end surface 34 are smaller than those of the first embodiment, strength of the rotor edge plate is increased.

Fourth Embodiment

Figure 12:
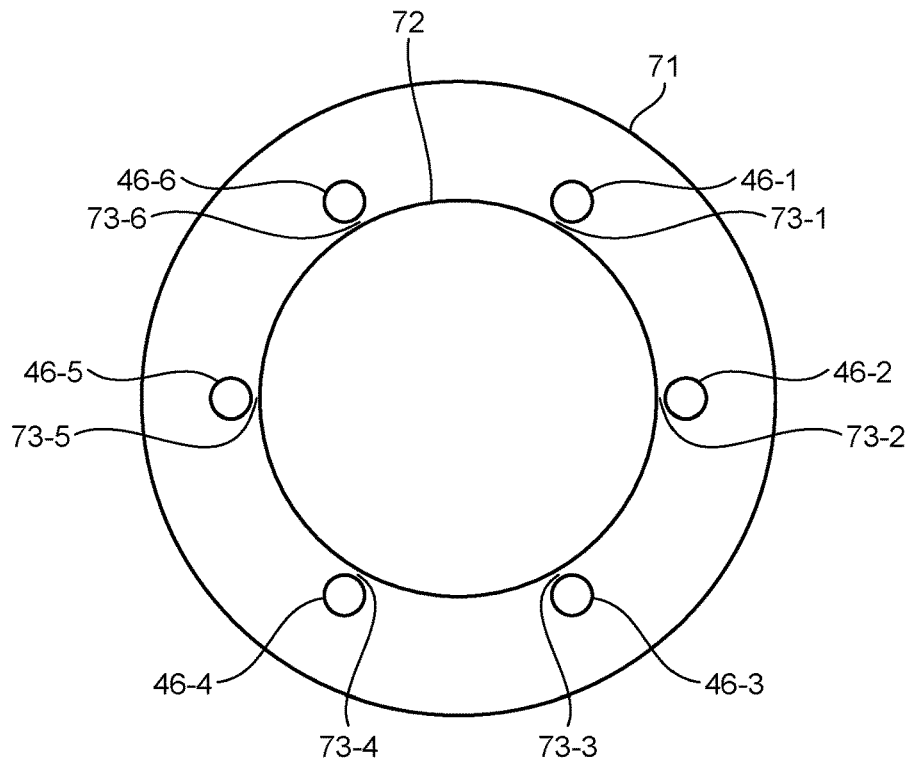
FIG. 12 is a plan view of a lower rotor edge plate of a compressor of a fourth embodiment.

A compressor of a fourth embodiment is configured such that the lower rotor edge plate 32 of the compressor 1 of the first embodiment is replaced with a different lower rotor edge plats 71, and the upper rotor edge plate 33 is replaced with a different upper rotor edge plate. FIG. 12 is a plan view of the lower rotor edge plate 71 of the compressor of the fourth embodiment. As illustrated in FIG. 12, in the lower rotor edge plate 71, the central opening portion 45 of the lower rotor edge plate 32 of the compressor 1 of the first embodiment described above is replaced with a central opening portion 72. The central opening portion 72 is formed in the center of the lower rotor edge plate 71, and is formed such that the edge extends along a circle centered at a center of the lower rotor edge plate 71.

In the lower rotor edge plate 71, a plurality of thick portions 73-1 to 73-6 (separation portions) are further formed. The plurality of thick portions 73-1 to 73-6 are formed between the central opening portion 72 and the plurality of rivet openings 46-1 to 46-6, and separate the central opening portion 72 and the plurality of rivet openings 46-1 to 46-6.

Figure 13:
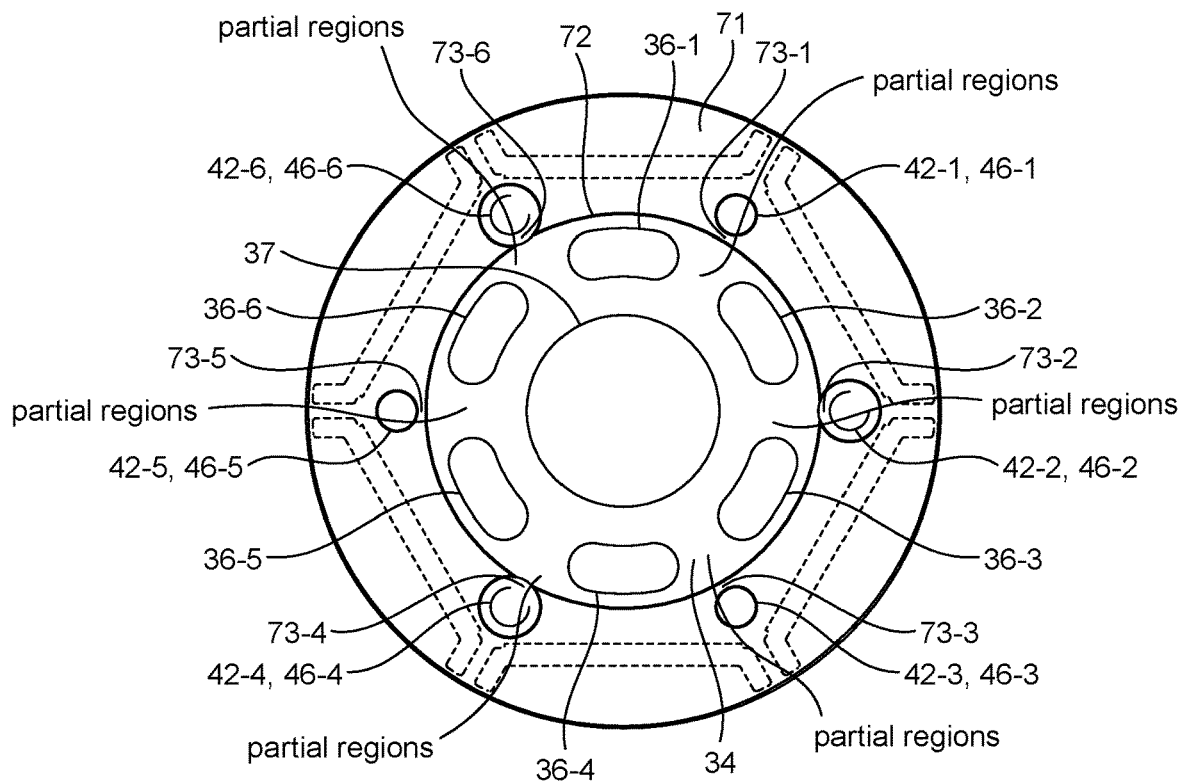
FIG. 13 is a plan view of a rotor in which the lower rotor edge plate of the compressor of the fourth embodiment is mounted on a rotor core.

FIG. 13 is a plan view of a rotor in which the lower rotor edge plate 71 of the compressor of the fourth embodiment is mounted on the rotor core 31. As illustrated in FIG. 13, the central opening portion 72 allows the plurality of refrigerant holes 36-1 to 36-6 and the shaft hole 37 to communicate with the internal space 7 when the lower rotor edge plate 71 is appropriately mounted on the rotor core 31. Further, the central opening portion 72 allows regions that are adjacent to the plurality of refrigerant holes 36-1 to 36-6 on the lower rotor end surface 34 to be exposed in the internal space 7, and allows partial regions that, are adjacent to the plurality of refrigerant holes 36-1 to 36-6 in the circumferential direction on the lower rotor end surface 34 to be exposed in the internal space 7.

In the lower rotor edge plate 71, because the edge of the central opening portion 72 is formed so as to extend along the circle, if distances between the plurality of refrigerant holes 36-1 to 36-6 and the edge of the central opening portion 72 are increased, widths of the plurality of thick portions 73-1 to 73-6 in the radial direction are reduced. That is, what is called a trade-off relationship is established. Therefore, by preventing the regions adjacent to the plurality of refrigerant holes 36-1 to 36-6 on the lower rotor end surface 34 from being excessively exposed in the internal space 7 (by preventing the flow passage resistance of the refrigerant flow passage from being excessively reduced), it is possible to ensure the widths of the thick portions 73-1 to 73-6 in the radial direction and increase strength.

An upper rotor edge plate of the compressor of the fourth embodiment is formed in the same manner as the lower rotor edge plate 71, where a central opening portion is formed and a plurality of thick portions are formed. Therefore, the upper rotor edge plate allows regions that are adjacent to the plurality of refrigerant holes 36-1 to 36-6 on the upper rotor end surface 35 to be exposed in the internal space 7, so that it is possible to reduce the flow passage resistance of the plurality of refrigerant flow passages formed in the rotor in the same manner as the lower rotor edge plate 71. With the formation of the plurality of thick portions, it is possible to increase strength of the upper rotor edge plate.

In the compressor of the fourth embodiment, because the edge of the central opening portion 72 is formed so as to extend the circle, it is not necessary to arrange corner portions in a mold when, for example, the rotor edge plate is formed by punching out from a plate-shaped base material by using the mold. Therefore, it is possible to increase the lifetime of the mold.

Fifth Embodiment

Figure 14:
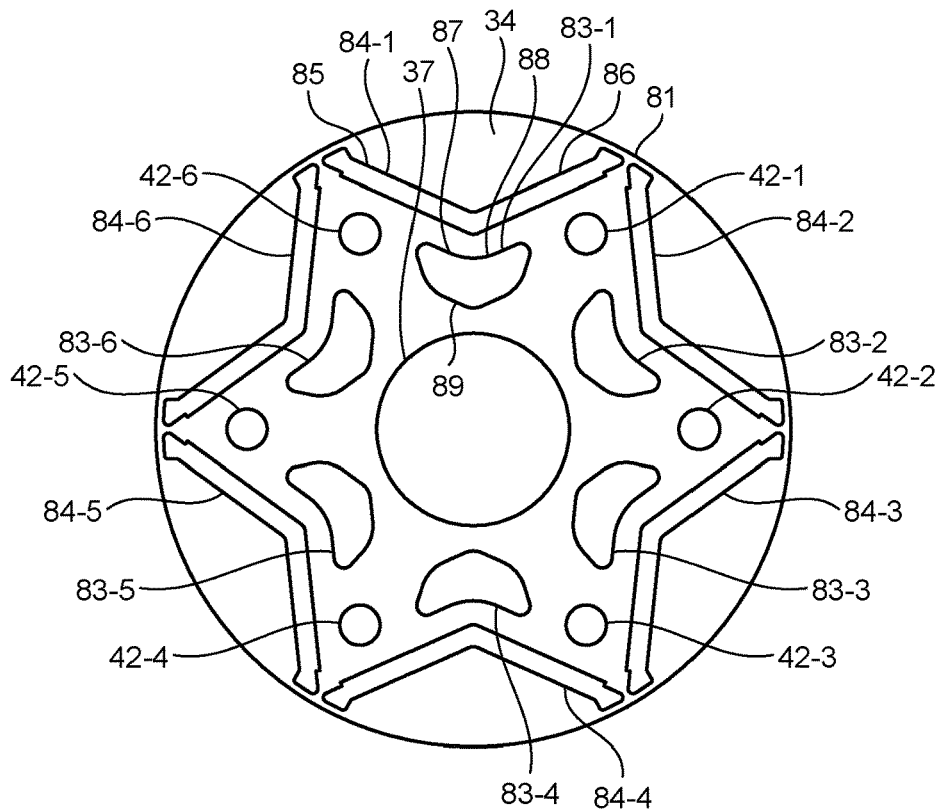
FIG. 14 is a plan view of a rotor core of a compressor of a fifth embodiment.

A compressor of a fifth embodiment is configured such that, as illustrated in FIG. 14, the rotor core 31 of the compressor 1 of the first embodiment described above is replaced with a different rotor core 81. FIG. 14 is a plan view of the rotor core 81 of the compressor of the fifth embodiment. In the rotor core 81, the plurality of refrigerant holes 36-1 to 36-6 of the rotor core 31 described above are replaced with a plurality of different refrigerant holes 83-1 to 83-6, the plurality of magnet holes 41-1 to 41-6 are replaced with a plurality of different magnet holes 84-1 to 84-6, and other configurations are the same as those of the rotor core 31. That is, in the rotor core 81, the lower rotor end surface 34 and the upper rotor end surface 35 are formed in the same manner as the rotor core 31 as described above, and the shaft hole 37 and the plurality of rivet holes 42-1 to 42-6 are also formed.

The plurality of refrigerant holes 83-1 to 83-6 are arranged at equal intervals around the shaft hole 37 in the same manner as the plurality of refrigerant holes 36-1 to 36-6 as described above. The plurality of magnet holes 84-1 to 84-6 are formed on the radially outer sides of the plurality of refrigerant holes 36-1 to 36-6 in the same manner as the plurality of magnet holes 41-1 to 41-6 as described above.

The first magnet hole 84-1 among the plurality of magnet holes 84-1 to 84-6 includes a first portion 85 and a second portion 86. In the first magnet hole 84-1, the first portion 85 and the second portion 86 are formed in what is called a V-shape in which a central portion is bent so as to protrude toward a radially inner side. The magnet holes other than the first magnet hole 84-1 among the plurality of magnet holes 84-1 to 84-6 are formed in the same manner as the first magnet hole 84-1. In the plurality of magnet holes 84-1 to 84-6, a plurality of permanent magnets are inserted in the same manner as in the plurality of refrigerant holes 36-1 to 36-6 as described above.

The first refrigerant hole 83-1 among the plurality of refrigerant holes 83-1 to 83-6 is formed on the radially inner side of the first magnet hole 84-1. An edge of the first refrigerant hole 83-1 on the radially outer side is formed of a first radially outer edge 87 and a second radially outer edge 88. The first radially outer edge 87 is arranged at a side closer to the first portion 85 of the first magnet hole 84-1, and is formed so as to extend along a flat surface that is parallel to a flat surface along which the first portion 85 extends. The second radially outer edge 88 is arranged at a side closer to the second portion 86 of the first magnet hole 84-1, and is formed so as to extend along a flat surface that is parallel to a flat surface along which the second portion 86 extends. That is, the edge of the first refrigerant hole 83-1 on the radially outer side is formed such that the edge extends along a curved line that is bent so as to protrude toward the radially inner side. An edge 89 of the first refrigerant hole 83-1 on a radially inner side is formed such that the edge 89 extends along a curved line that is bent so as to protrude toward the radially inner side, and is formed such that the center is sharpened to the radially inner side. The refrigerant holes other than the first refrigerant hole 83-1 among the plurality of refrigerant holes 83-1 to 83-6 are formed in the same manner as the first refrigerant hole 83-1.

FIG. 15 is a plan view of a rotor of the compressor of the fifth embodiment. As illustrated in FIG. 15, the central opening portion 45 allows the shaft hole 37 to be exposed in the internal space 7 and allows the plurality of refrigerant holes 83-1 to 83-6 to communicate with the internal space 7 when the lower rotor edge plate 32 is appropriately mounted on the rotor core 81. In the rotor of the compressor of the fifth embodiment, due to communication of the plurality of refrigerant holes 83-1 to 83-6 with the internal space 7, a plurality of refrigerant flow passages for connecting the upper part and the lower part of the motor unit 6 are formed. Further, the central opening portion 45 allows regions that are adjacent to the plurality of refrigerant holes 36-1 to 36-6 on the lower rotor end surface 34 to be exposed in the internal space 7, and allows partial regions that are adjacent to the plurality of refrigerant holes 36-1 to 36-6 in the circumferential direction on the lower rotor end surface 34 to be exposed in the internal space 7.

With the arrangement of the plurality of refrigerant holes 83-1 to 83-6 and the plurality of magnet holes 41-1 to 41-6, the rotor core 81 is able to highly effectively cool the plurality of permanent magnets that are inserted in the plurality of magnet holes 84-1 to 84-6, by using the refrigerant that flows through the plurality of refrigerant flow passages. The compressor of the fifth embodiment is able to reduce adverse effects that are caused by heat generated by the plurality of permanent magnets, by highly effectively cooling the plurality of permanent magnets.

Sixth Embodiment

FIG. 16 is a plan view of a rotor of a compressor of a sixth embodiment. In the compressor of the sixth embodiment, as illustrated in FIG. 16, the lower rotor edge plate 51 of the compressor of the second embodiment described above is mounted on the rotor core 81 of the compressor of the fifth embodiment described above. The central opening portion 52 of the lower rotor edge plate 51 allows the shaft hole 37 and the plurality of refrigerant holes 83-1 to 83-6 to be exposed in the internal space 7 and allows the plurality of refrigerant holes 83-1 to 83-6 to communicate with the internal space 7 when the lower rotor edge plate 51 is appropriately mounted on the rotor core 81. In the rotor of the compressor of the sixth embodiment, due to communication of the plurality of refrigerant holes 83-1 to 83-6 with the internal space 7, a plurality of refrigerant flow passages for connecting the upper part and the lower part of the motor unit 6 are formed. Further, the central opening portion 52 allows regions that are adjacent to the plurality of refrigerant holes 83-1 to 83-6 on the lower rotor end surface 34 to be exposed in the internal space 7, and allows partial regions that are adjacent to the plurality of refrigerant holes 83-1 to 83-6 in the circumferential direction on the lower rotor end surface 34 to be exposed in the internal space 7.

By allowing the regions adjacent to the plurality of refrigerant holes 83-1 to 83-6 to be exposed in the internal space 7, the compressor of the sixth embodiment is able to reduce the flow passage resistance of the plurality of refrigerant flow passages in the same manner as the compressors of the embodiments as described above. With the formation of the plurality of thick portions 55-1 to 55-6 in the lower rotor edge plate 51, the compressor of the sixth embodiment is able to increase the strength of the lower rotor edge plate 51 in the same manner as in the compressors of the embodiments as described above.

In the compressor of the sixth embodiment, a part of the edge of the central opening portion 52 is formed by the plurality of curved edges 54-1 to 54-6, so that while the regions that are exposed on the radially outer sides of the plurality of refrigerant holes 83-1 to 83-6 on the lower rotor end surface 34 are smaller than those of the first embodiment, strength of the rotor edge plate is increased.

Seventh Embodiment

Figure 17:
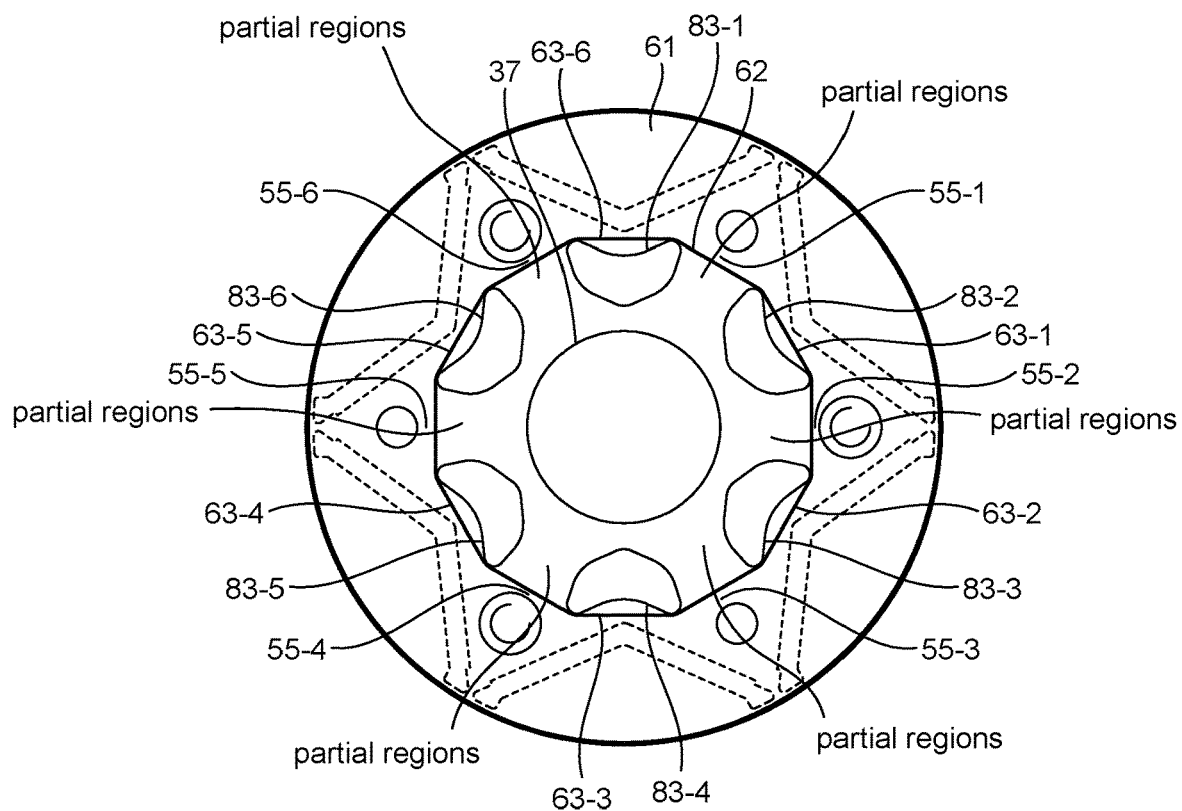
FIG. 17 is a plan view of a rotor in which a lower rotor edge plate of a compressor of a seventh embodiment is mounted on a rotor core.

FIG. 17 is a plan view of a rotor of a compressor of a seventh embodiment. In the compressor of the seventh embodiment, as illustrated in FIG. 17, the lower rotor edge plate 61 of the compressor of the third embodiment described above is mounted on the rotor core 81 of the compressor of the fifth embodiment described above. The central opening portion 62 of the lower rotor edge plate 61 allows the shaft hole 37 and the plurality of refrigerant holes 83-1 to 83-6 to be exposed in the internal space 7 and allows the plurality of refrigerant holes 83-1 to 83-6 to communicate with the internal space 7 when the lower rotor edge plate 61 is appropriately mounted on the rotor core 81. Further, the central opening portion 62 allows regions that are adjacent to the plurality of refrigerant holes 83-1 to 83-6 on the lower rotor end surface 34 to be exposed in the internal space 7, and allows partial regions that are adjacent to the plurality of refrigerant holes 83-1 to 83-6 in the circumferential direction on the lower rotor end surface 34 to be exposed in the internal space 7.

By allowing the regions adjacent to the plurality of refrigerant holes 83-1 to 83-6 to be exposed in the internal space 7, the compressor of the seventh embodiment is able to reduce the flow passage resistance of the plurality of refrigerant flow passages in the same manner as the compressors of the embodiments as described above. With the formation of the plurality of thick portions 55-1 to 55-6, the compressor of the seventh embodiment is able to increase the strength of the lower rotor edge plate 61 in the same manner as in the compressors of the embodiments as described above.

In the compressor of the seventh embodiment, a part of the edge of the central opening portion 62 is formed by the plurality of linear edges 63-1 to 63-6, so that while the regions that are exposed on the radially outer sides of the plurality of refrigerant holes 83-1 to 83-6 on the lower rotor end surface 34 are smaller than those of the first embodiment, strength of the rotor edge plate is increased.

Eighth Embodiment

Figure 18:
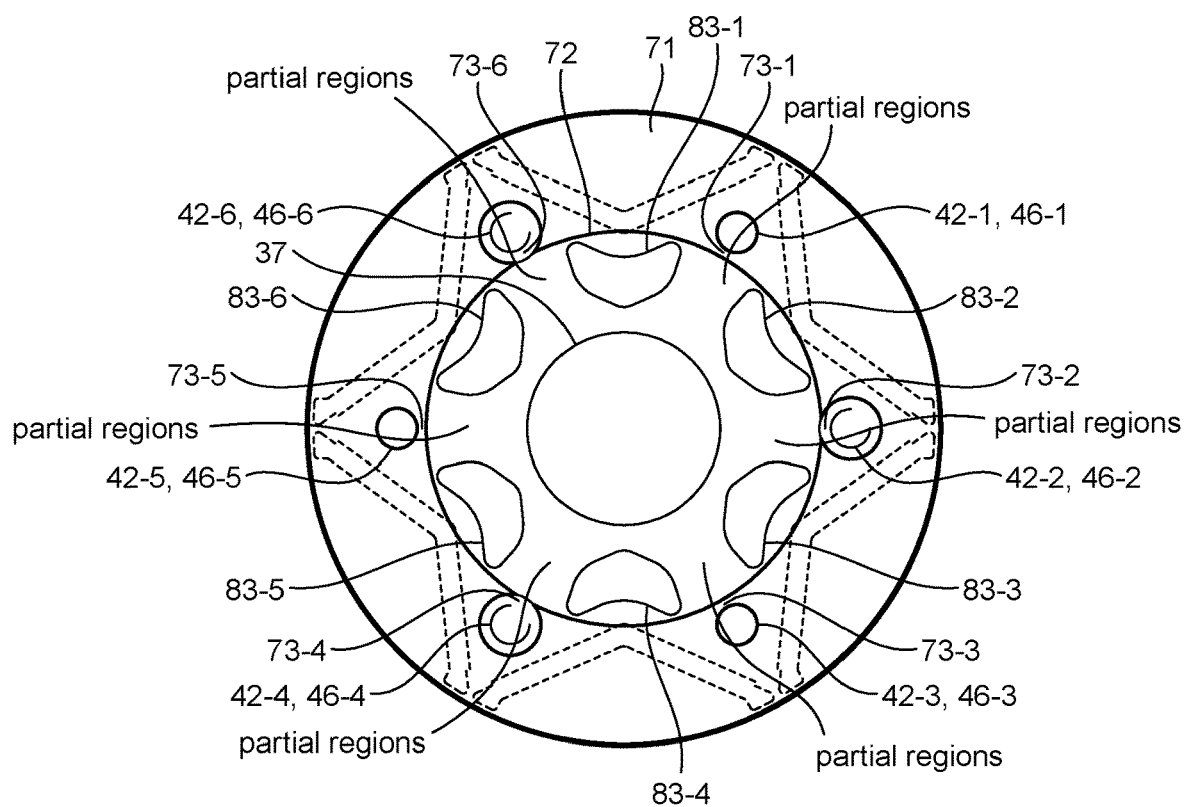
FIG. 18 is a plan view of a rotor in which a lower rotor edge plate of a compressor of an eighth embodiment is mounted on a rotor core.

FIG. 18 is a plan view of a rotor of a compressor of an eighth embodiment. In the compressor of the eighth embodiment, as illustrated in FIG. 18, the lower rotor edge plate 71 of the compressor of the fourth embodiment described above is mounted on the rotor core 81 of the compressor of the fifth embodiment described above. The central opening portion 72 of the lower rotor edge plate 71 allows the shaft hole 37 and the plurality of refrigerant holes 83-1 to 83-6 to be exposed in the internal space 7 and allows the plurality of refrigerant holes 83-1 to 83-6 to communicate with the internal space 7 when the lower rotor edge plate 71 is appropriately mounted on the rotor core 81. Further, the central opening portion 72 allows regions that are adjacent to the plurality of refrigerant holes 83-1 to 83-6 on the lower rotor end surface 34 to be exposed in the internal space 7, and allows partial regions that are adjacent to the plurality of refrigerant holes 83-1 to 83-6 in the circumferential direction on the lower rotor end surface 34 to be exposed in the internal space 7.

By allowing the regions adjacent to the plurality of refrigerant holes 83-1 to 83-6 to be exposed in the internal space 7, the compressor of the eighth embodiment is able to reduce the flow passage resistance of the plurality of refrigerant flow passages in the same manner as the compressors of the embodiments as described above. With the formation of the plurality of thick portions 73-1 to 73-6, the compressor of the eighth embodiment is able to increase the strength of the lower rotor edge plate 71 as in the compressors of the embodiments as described above.

In the compressor of the eighth embodiment, a part of the edge of the central opening portion 72 is formed so as to extend along the circle, so that if distances between the plurality of refrigerant holes 83-1 to 83-6 and the central opening portion 72 are increased, widths of the plurality of thick portions 73-1 to 73-6 in the radial direction are reduced. That is, what is called a trade-off relationship is established.

Therefore, by preventing the regions adjacent to the plurality of refrigerant holes 83-1 to 83-6 on the lower rotor end surface 34 from being excessively exposed in the internal space 7 (by preventing the flow passage resistance of the refrigerant flow passage from being excessively reduced), it is possible to ensure the widths of the thick portions 73-1 to 73-6 in the radial direction and increase strength.

Ninth Embodiment

In the compressors explained in the first embodiment to the eighth embodiments, the upper rotor edge plate and the lower rotor edge plate are formed in the same shape, but may be formed in different shapes. This will be described below as a ninth embodiment with reference to the drawings.

Figure 19:
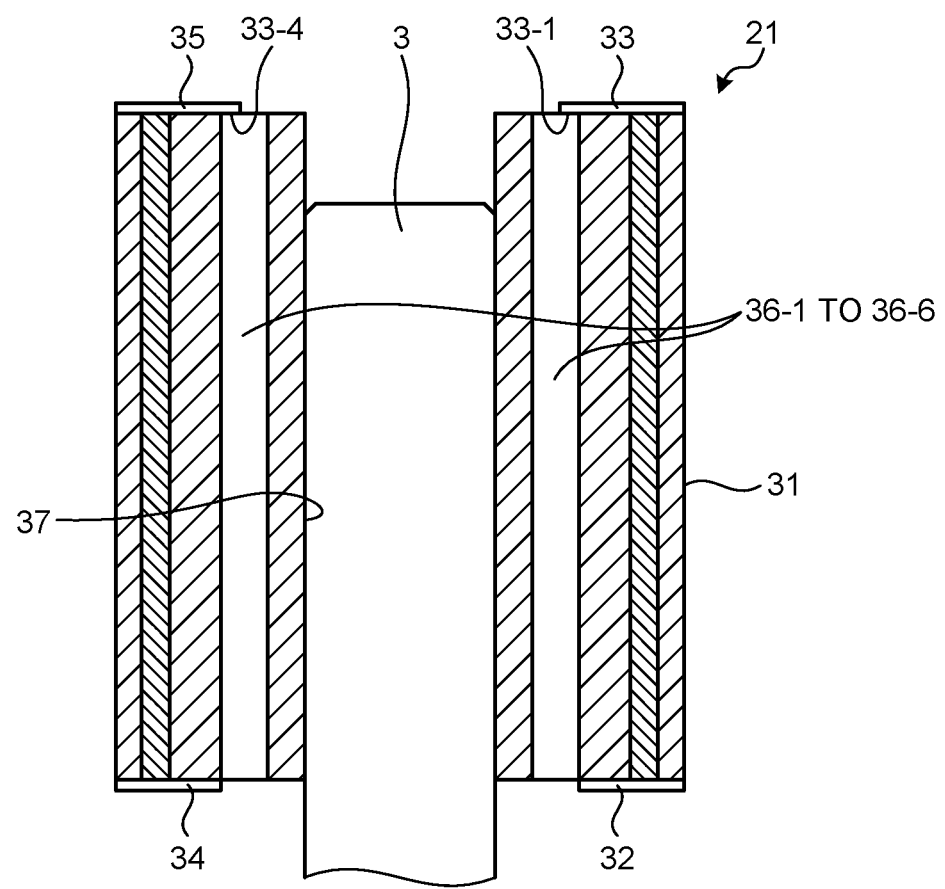
FIG. 19 is a cross-sectional view of a rotor of a compressor of a ninth embodiment.
Figure 20:
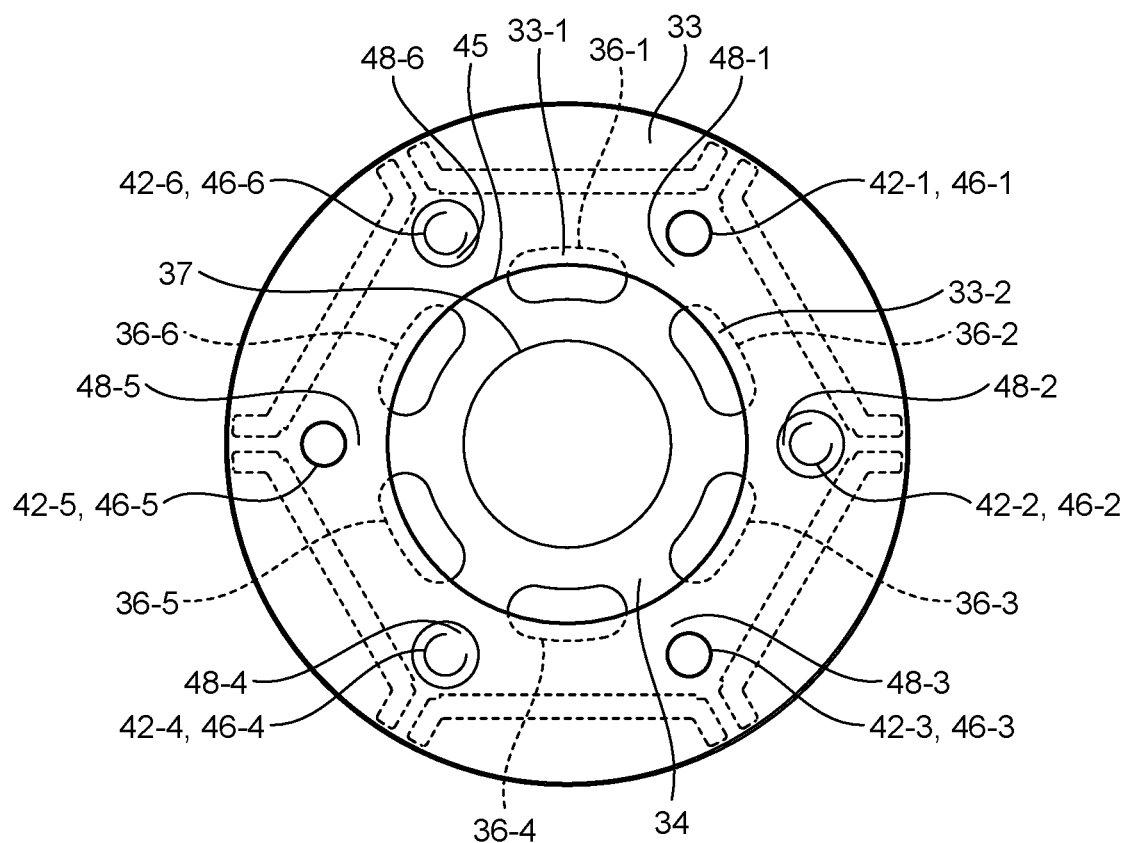
FIG. 20 is a plan view of the rotor in which an upper rotor edge plate of the compressor of the ninth embodiment is mounted on a rotor core.

FIG. 19 is a cross-sectional view of the rotor 21 of a compressor of the ninth embodiment. FIG. 20 is a plan view of the rotor 21 of the ninth embodiment. The compressor of the ninth embodiment is different from the compressor 1 of the first embodiment described above only in terms of an upper rotor edge plate. As illustrated in FIG. 20, the upper rotor edge plate 33 is formed such that the edge of a central opening portion (upper opening) extends along a circle. In contrast, a lower rotor edge plate is formed such that the edge of the central opening portion 45 (lower opening) extends along a polygon in the same manner as the upper rotor edge plate of the first embodiment as described above with reference to FIG. 4. Therefore, the upper rotor edge plate and the lower rotor edge plate can be easily distinguished from each other because the shapes of the edges of the central opening portion 45 are different. Consequently, it is possible to accurately mount the upper rotor edge plate and the lower rotor edge plate when the rotor is assembled, and easily and visually recognize presence or absence of an erroneous combination after the rotor is assembled.

Further, the lower rotor edge plate of the present embodiment is arranged such that vertices of the polygon are located on the radially outer sides of the plurality of refrigerant holes 36-1 to 36-6 as illustrated in FIG. 4. The compressor 1 as described above is able to allow regions that are adjacent to the plurality of refrigerant holes 36-1 to 36-6 on the lower rotor end surface 34 to be largely exposed in the internal space 7, so that it is possible to further reduce the flow passage resistance of the plurality of refrigerant flow passages formed in the rotor 21.

In contrast, as illustrated in FIG. 20, the upper rotor edge plate 33 is formed such that the edge of the central opening portion extends along the circle. Further, a circular central opening portion and a plurality of rivet openings are formed. Here, the edge of the central opening portion of the upper rotor edge plate 33 covers parts of upper outer peripheries of the plurality of refrigerant holes 36-1 to 36-6 at the side of the upper rotor end surface 35. With this configuration, even when the central opening portion has a circular shape, the widths of the plurality of thick portions 48-1 to 48-6 in the radial direction are increased, and the strength of the plurality of thick portions 48-1 to 48-6 is increased.

Specifically, in the upper rotor edge plate 33, a plurality of protruding portions 33-1 to 33-6 are formed so as to cover parts of the upper outer peripheries of the plurality of refrigerant holes 36-1 to 36-6 at the side of the upper rotor end surface 35. With the formation of the plurality of protruding portions 33-1 to 33-6 in the upper rotor edge plate 33, the flow passage resistance increases as compared to a case in which the plurality of protruding portions 33-1 to 33-6 are not formed. However, with the formation of the plurality of protruding portions 33-1 to 33-6 in the upper rotor edge plate 33, it is possible to reduce a discharge amount of refrigeration machine oil as will be described later.

First, as illustrated in FIG. 1, the refrigeration machine oil stored in the oil reservoir 8 of the compressor 1 is supplied to the compressor unit 5 with rotation of the shaft 3, and used as lubricant oil for reducing friction that acts between mechanical elements included in the compressor unit 5. When the compressor unit 5 compresses low-pressure refrigerant gas to generate high-pressure refrigerant gas, the refrigeration machine oil is mixed with the high-pressure refrigerant gas and supplied to a space between the motor unit 6 and the compressor unit 5 in the internal space 7. When the refrigeration machine oil passes through the plurality of refrigerant holes 35-1 to 36-6 while being mixed with the refrigerant, the refrigeration machine oil hits against the plurality of protruding portions 33-1 to 33-6, and is separated from the refrigerant inside the plurality of refrigerant holes 36-1 to 36-6.

With the formation of the plurality of protruding portions 33-1 to 33-6, the compressor 1 of the present embodiment prevents the refrigeration machine oil from flowing out to an upper part of the motor unit 6 in the internal space 7. Therefore, the compressor 1 of the present embodiment is able to reduce the amount of the refrigeration machine oil supplied to the upper part of the motor unit 6 in the internal space 7, and reduce discharge of the refrigeration machine oil together with the refrigerant to a device on a subsequent stage.

Meanwhile, the compressor unit 5 of the compressors of the embodiments as described above is formed with a rotary compressor, but may be replaced with a different compressor unit that is formed with a mechanism different from the rotary compressor. Examples of the mechanism include a scroll compressor. Even when the compressor includes the compressor unit as described above, it is possible to ensure an opening through which the refrigerant passes in the lower rotor edge plate or the upper rotor edge plate, and ensure strength of the lower rotor edge plate or the upper rotor edge plate.

While the embodiments have been explained above, the embodiments are not limited by the contents described above. Further, structural elements described above include one that can be easily thought of by a person skilled in the art, one that is practically identical, and one that is within an equivalent range. Furthermore, the structural elements described above may be combined appropriately. Moreover, within the scope not departing from the gist of the embodiments described above, various omission, replacement, and modifications of the structural elements may be made.

REFERENCE SIGNS LIST 1 compressor
2 housing
3 shaft
5 compressor unit
6 motor unit
7 Internal space
21 rotor
22 stator
31 rotor core
32 lower rotor edge plate
33 upper rotor edge plate
34 lower rotor end surface
35 upper rotor end surface
36-1 to 36-6 refrigerant holes
42-1 to 42-6 rivet holes
45 central opening portion
46-1 to 46-6 rivet openings
48-1 to 48-6 thick portions
51 lower rotor edge plate
52 central opening portion
55-1 to 55-6 thick portions
51 lower rotor edge plate
62 central opening portion
53-1 to 53-6 linear edges
71 lower rotor edge plate
72 central opening por'ion
73-1 to 73-6 thick portions
81 rotor core
83-1 to 83-6 refrigerant holes

The invention claimed is:

1. A compressor comprising:
   a rotor;
   a stator configured to rotate the rotor;
   a compressor unit configured to compress a refrigerant with rotation of the rotor; and
   a housing in which an internal space for housing the rotor, the stator, and the compressor unit is formed, wherein
   the rotor includes
      a rotor core that is formed in a cylindrical shape and has an upper surface and a lower surface;
      an upper rotor edge plate that covers the upper surface;
      a lower rotor edge plate that covers the lower surface; and
      a fixing member that fixes the upper rotor edge plate and the lower rotor edge plate to the rotor core,
   a plurality of refrigerant holes through which the refrigerant passes are formed in the rotor core,
   an upper opening that allows the plurality of refrigerant holes to communicate with the internal space is formed in the upper rotor edge plate,
   a lower opening that allows the plurality of refrigerant holes to communicate with the internal space is formed in the lower rotor edge plate, an upper fixing member opening through which the fixing member penetrates is formed in the upper rotor edge plate, a lower fixing member opening through which the fixing member penetrates is formed in the lower rotor edge plate, an upper separation portion separating the upper opening and the upper fixing member opening is formed in the upper rotor edge plate, a lower separation portion separating the lower opening and the lower fixing member opening is formed in the lower rotor edge plate, the upper opening and the lower opening have different shapes, an area of the upper opening is smaller than an area of the lower opening, and the lower surface faces the compressor unit.

2. The compressor according to claim 1, wherein the lower opening allows the refrigerant holes and partial regions that are adjacent to the refrigerant holes in a circumferential direction on the rotor core to be exposed in the internal space.

3. The compressor according to claim 2, wherein the lower fixing member opening is arranged on a radially outer side of the partial regions.

4. The compressor according to claim 2, wherein
the lower opening is formed such that edges of the lower opening are along a polygon, and
vertices of the polygon are arranged on radially outer sides of the refrigerant holes.

5. The compressor according to claim 4, wherein
the lower fixing member opening is arranged at a position facing an edge corresponding to a side of the polygon in the lower opening.

* * * * *